United States Patent

Reeder et al.

[11] Patent Number: 6,122,350
[45] Date of Patent: Sep. 19, 2000

[54] PSTN APPLIANCE SECURITY SYSTEM WITH REDUCED PSTN TRAFFIC LOADING

[75] Inventors: Stephen M Reeder, Essex; Jonathan Hopkins; David W Bradley, both of Suffolk, all of United Kingdom

[73] Assignee: British Telecommunications public limited company, London, United Kingdom

[21] Appl. No.: 09/043,180

[22] PCT Filed: Feb. 4, 1998

[86] PCT No.: PCT/GB98/00337

§ 371 Date: May 16, 1998

§ 102(e) Date: May 16, 1998

[87] PCT Pub. No.: WO98/36391

PCT Pub. Date: Aug. 20, 1998

[30] Foreign Application Priority Data

Feb. 17, 1997 [GB] United Kingdom ............... 97301006

[51] Int. Cl.[7] .............................................. H04M 11/00
[52] U.S. Cl. ........................... 379/102.04; 379/90.01; 379/106.01; 340/531; 340/825.36
[58] Field of Search ..................... 379/39, 40, 44, 379/45, 49–51, 106.01, 102.01–102.04, 142, 93.02, 90.01, 110.01; 340/531, 533, 534, 538, 568, 687, 825.32, 825.36, 825.16, 825.49

[56] References Cited

U.S. PATENT DOCUMENTS

| | | |
|---|---|---|
| 4,942,599 | 7/1990 | Gordon et al. . |
| 5,021,779 | 6/1991 | Bisak . |
| 5,022,067 | 6/1991 | Hughes . |
| 5,351,289 | 9/1994 | Logsdon et al. . |
| 5,406,269 | 4/1995 | Baran . |
| 5,406,619 | 4/1995 | Akhteruzzaman et al. . |
| 5,410,326 | 4/1995 | Goldstein . |
| 5,729,596 | 3/1998 | Reeder et al. ................ 379/90.01 |

FOREIGN PATENT DOCUMENTS

| | | |
|---|---|---|
| 0549128 A2 | 6/1993 | European Pat. Off. . |
| 0675626 A1 | 10/1995 | European Pat. Off. . |
| WO 96/03728 | 2/1996 | WIPO . |

Primary Examiner—Wing F. Chan
Attorney, Agent, or Firm—Nixon & Vanderhye P.C.

[57] ABSTRACT

A security system includes a service platform attached to a telephone network and accessible through the network. The platform is responsive to calling line identity signals (CLI) provided by the network operator to identify individual telephone lines from which calls originate and in response thereto to transmit a data list identifying protected apparatus at customer premises and release codes therefor. A home control center is responsive to signals received over a mains electricity line from protected apparatus to transmit to the apparatus a release code, the apparatus including a security module responsive to receipt of the respective release code to supply power to operational circuits of the apparatus. If a valid release code is not received from the home control center on request from the apparatus then power is denied to the apparatus. The service platform supplies a house code and a specific apparatus code and location code to the home control center for transmission to a protected apparatus on first connection of mains power thereto. Subsequent to the security protection being provided, the apparatus will only operate when connected in its home environment until such time as a blanking message is received from the service platform.

28 Claims, 17 Drawing Sheets

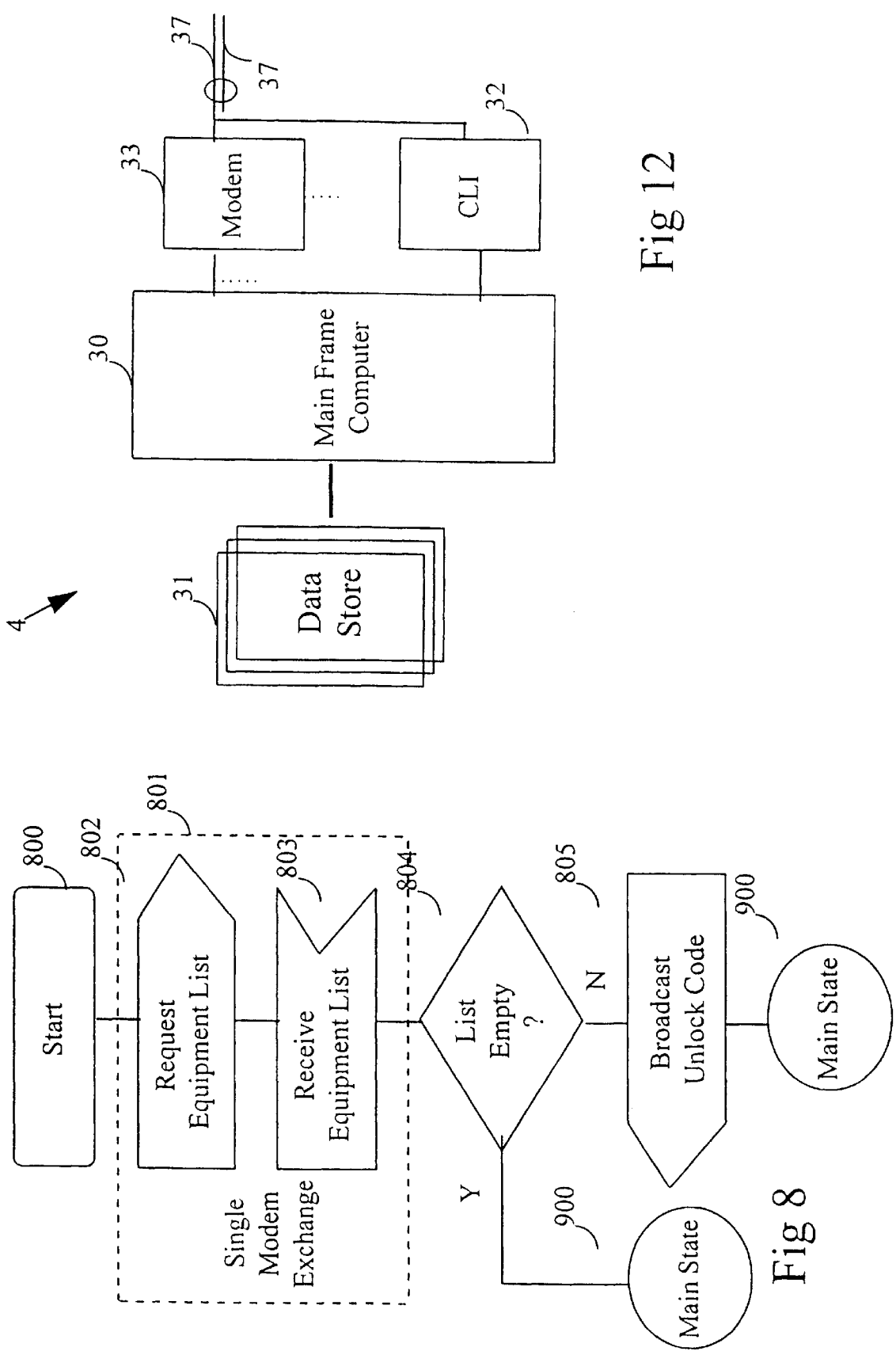

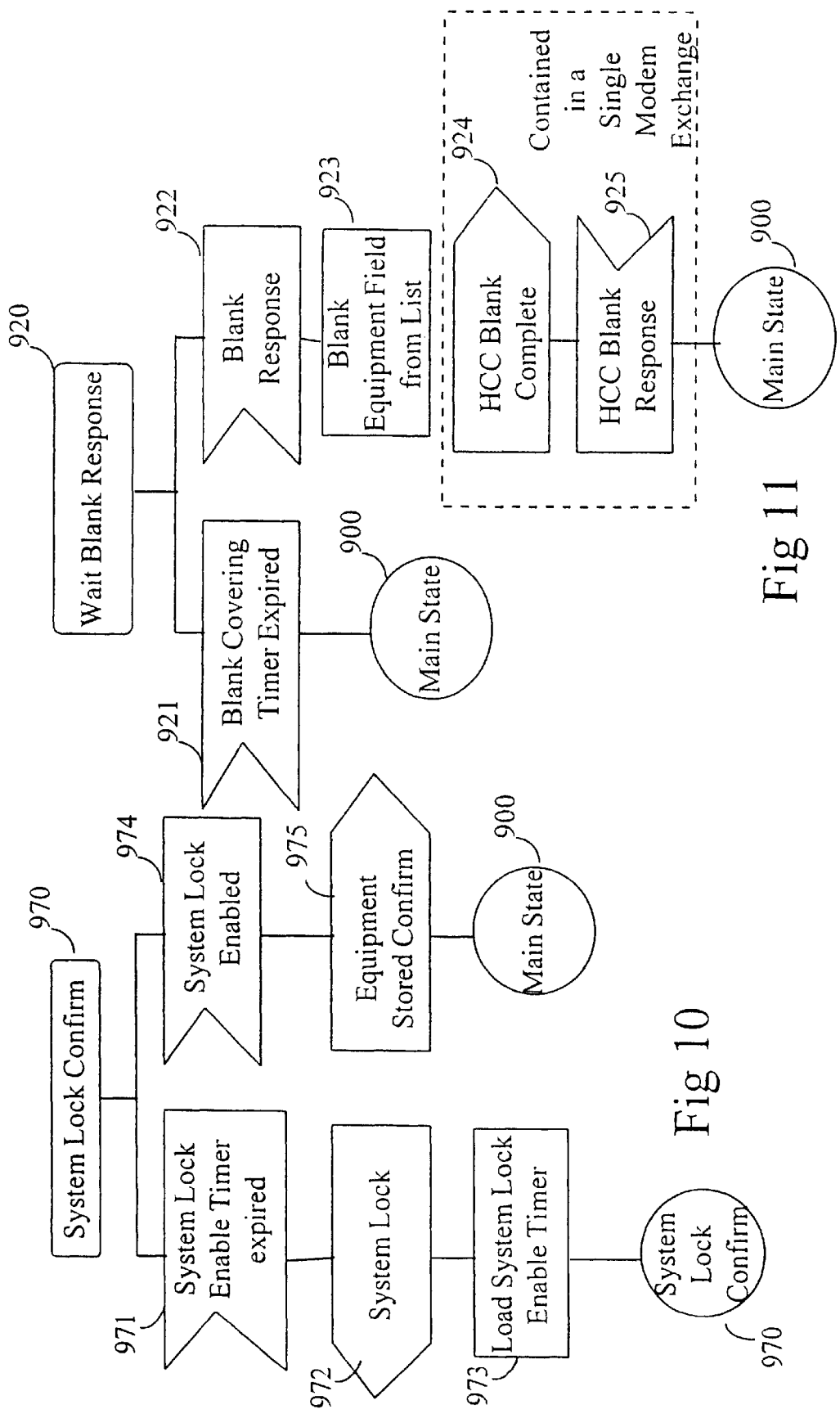

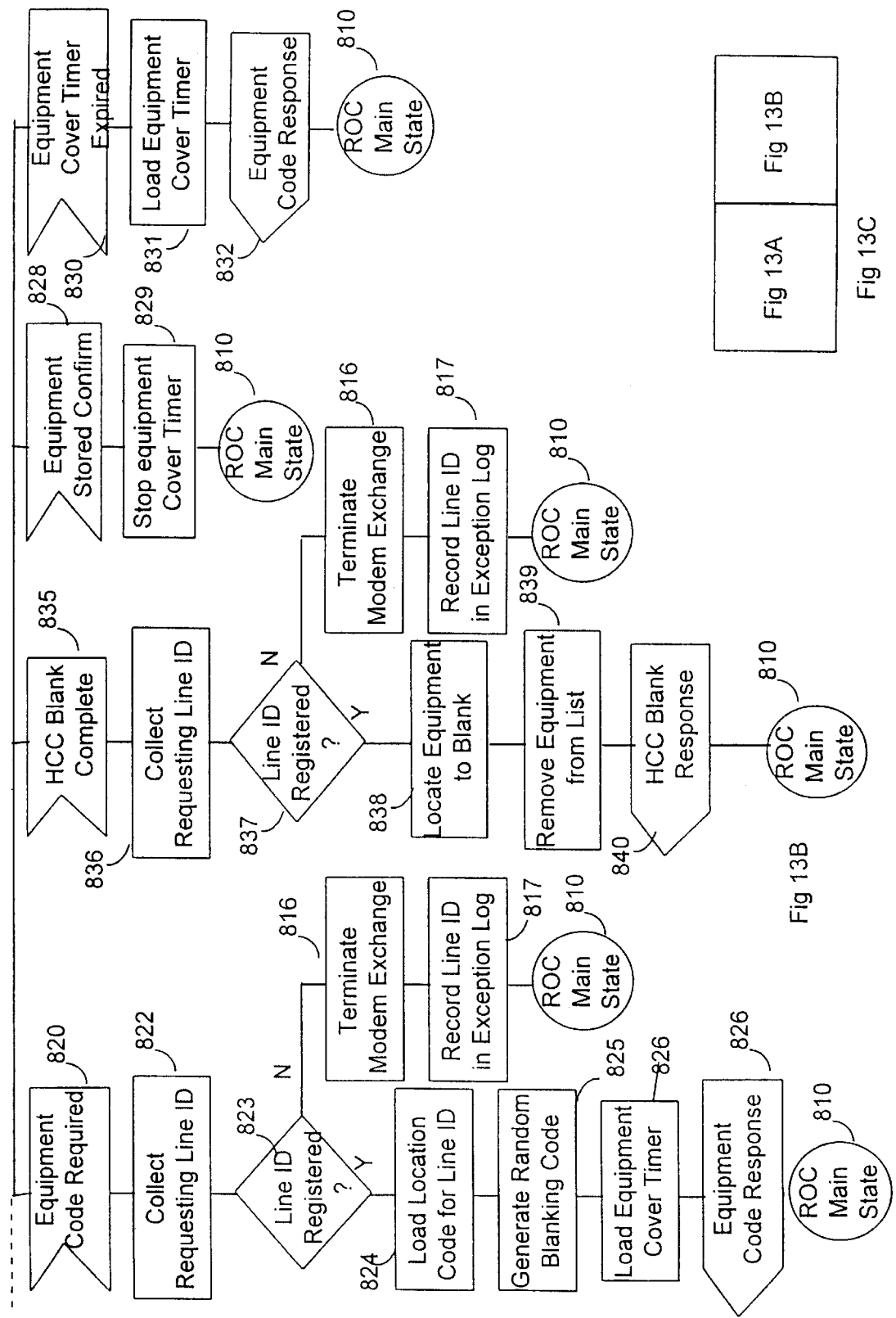

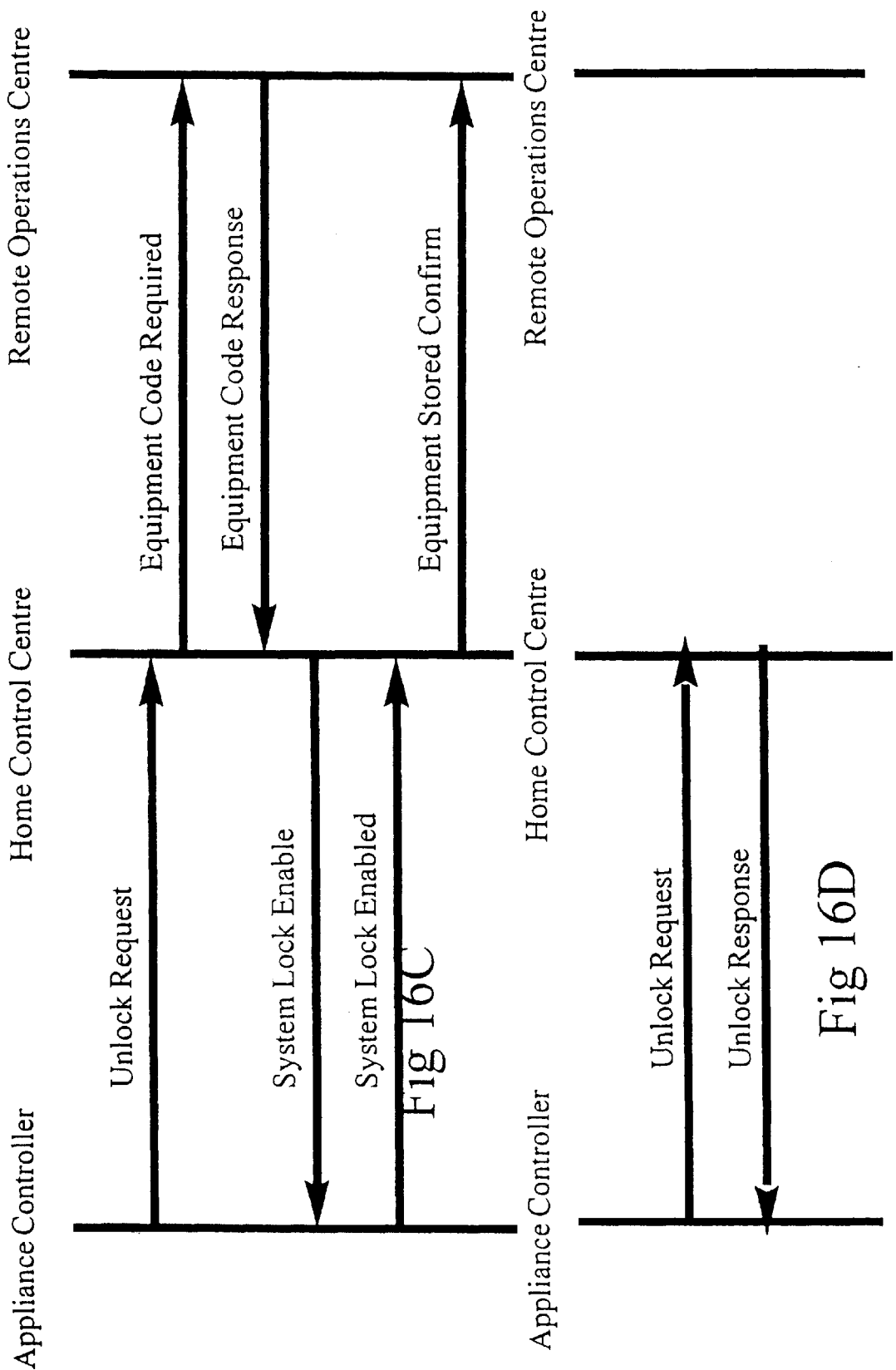

Data Storage: Security Aware Appliance:

Manufacturer Reference (16 Bits) Manufacturer's Equipment Reference (48 Bits)

Electronic Serial Number (64 Bits)

Appliance Location Code (ROC Identity 24 Bits, House Identity 40 Bits)

House Unlock Code (24 Bits)

Appliance Unlock Code (24 Bits)

Blanking Code (24 Bits)

Flags: Blanked, System Lock,

Fig 17

| Data Storage: Remote Operations Centre | | |
|---|---|---|
| Per Customer Location: | Location Code (40 Bits) | |
| | House Unlock Code (24 Bits) | |
| | Calling Line Identity (Customer Telephone Number) | |
| | Customer blanking PIN | |
| | Customer Name (20 ASCII Characters) | |
| | Customer Address (20 ASCII Characters) (Several Lines) | |
| | Number of Appliances in List (16 Bits) | |
| Per Appliance : | List No (16 Bits) | |
| | Equipment Type (64 Bits) | |
| | Electronic Serial Number (64 Bits) | |
| | Appliance Unlock Code (24 Bits) | |
| | Blanking Code (24 Bits) | |
| | Flags: Blank, System Lock, | |

Fig 18

| Data Storage: Home Control Centre (Volatile) | Number of Appliances in List (16 Bits) | House Unlock Code (24 Bits) | List No (16 Bits), | Appliance ID (128 Bits) | Appliance Unlock Code (24 Bits) | Blanking Code (24 Bits) | Flags: Blanked, System Lock, |
|---|---|---|---|---|---|---|---|
| | | | (Per Appliance): | | | | |

Fig 19

PSTN APPLIANCE SECURITY SYSTEM WITH REDUCED PSTN TRAFFIC LOADING

BACKGROUND OF THE INVENTION

1. Field of the Invention

The present invention relates to security systems and more particularly but not exclusively to a security system for protecting consumer apparatus from theft.

2. Related Art

In our co-pending European Patent application No. 94302211.1 (Publication No EP 0675626A) there is described a security system which utilises an interface between a domestic power supply and the public switched telephone network (PSTN) to provide identity signals derived from the calling line identity (CLI) of the customers PSTN telephone line. The identity signals are requested by a security module in apparatus such as televisions, video recorders, hi fi equipment and the like.

The system is arranged such that each time mains electrical power is connected to protected apparatus the security module requests (by way of the electrical power circuit) an identity code. The interface to the telephone network recognises the request from the mains supply circuit and causes a telephone call to be established via the PSTN to the security control centre which returns an identity code. The identity code is compared with a previously stored identity code in the protected apparatus, non-identity being used to prevent power being supplied to operational circuits.

It has been realised that while the security system previously described provides a high level of protection (by making stolen goods unattractive to thieves since they will not work away from their proper location), since connection of any of several items of protected apparatus will result in a corresponding number of PSTN calls, high levels of PSTN traffic may be generated resulting in network congestion and higher consumer costs.

SUMMARY OF THE INVENTION

According to the present invention there is provided a security system comprising access means to cause seizure of a connection to a telephone exchange, means in the exchange to generate coded signals which identify the source of the seizure and service means responsive to the coded signals to transmit to the access means security signals which identify at least one protected apparatus and a release code for each such protected apparatus.

Preferably the service means transmits a data table identifying each protected apparatus with a corresponding release code and a house code for all protected apparatuses at a specified location, said house code being used to release all said protected apparatuses simultaneously.

The access means may include a data store which is cleared of all data if either the mains electrical power or the telephone line is disconnected from the access means, the data store holding a list of identities for each protected apparatus at the location and a release code for each such protected apparatus.

After disconnection of electrical power to the access means, and on subsequent reconnection thereof, the access means may be arranged to cause seizure of a connection to service means responsive to signals which identify the location of the access means to transmit thereto the list of apparatuses and release codes therefor. A house code may also be received by the access means, the access means immediately transmitting the house code to the mains power circuit.

A security module for inclusion in electrically powered apparatus and having means responsive to signals received from a power line to permit or deny connection of electrical power to operational circuits of the apparatus, the module being responsive to connection of mains power to monitor the electrical power line for signals identifying a house code valid for the protected apparatus to permit connection of power to operational circuits and if such signals are not received within a predetermined period to transmit to the power line signals requesting a release code for the apparatus.

The house code and release code for a protected apparatus may be the same or may be different, and, if different, the release code may be specific to the protected apparatus.

The module may transmit signals to line identifying its type, origin and serial number for example whereby manufacturers and/or wholesalers or retailers of such apparatus may protect stocks of apparatuses.

BRIEF DESCRIPTION OF THE DRAWINGS

A security system in accordance with the invention including access means and modules in accordance with the features of the invention will now be described by way of example only with reference to the accompanying drawings of which:

FIGS. 8, 9, 10 and 11 are flow charts showing the operation of the home control centre of FIG. 7.

FIG. 12 is a block schematic diagram of a part of the remote operations centre for of FIG. 1.

FIGS. 16A to 16E shows schematically message flows between the apparatuses of FIGS. 2, 7 and 12.

FIG. 17 is a schematic representation of a data storage in the apparatus of FIG. 2.

FIG. 18 is a schematic representation of data storage in the apparatus of FIG. 12; and FIG. 19 is a schematic representation of data storage in the apparatus of FIG. 7.

DETAILED DESCRIPTION OF EXEMPLARY EMBODIMENTS

Figure 1:
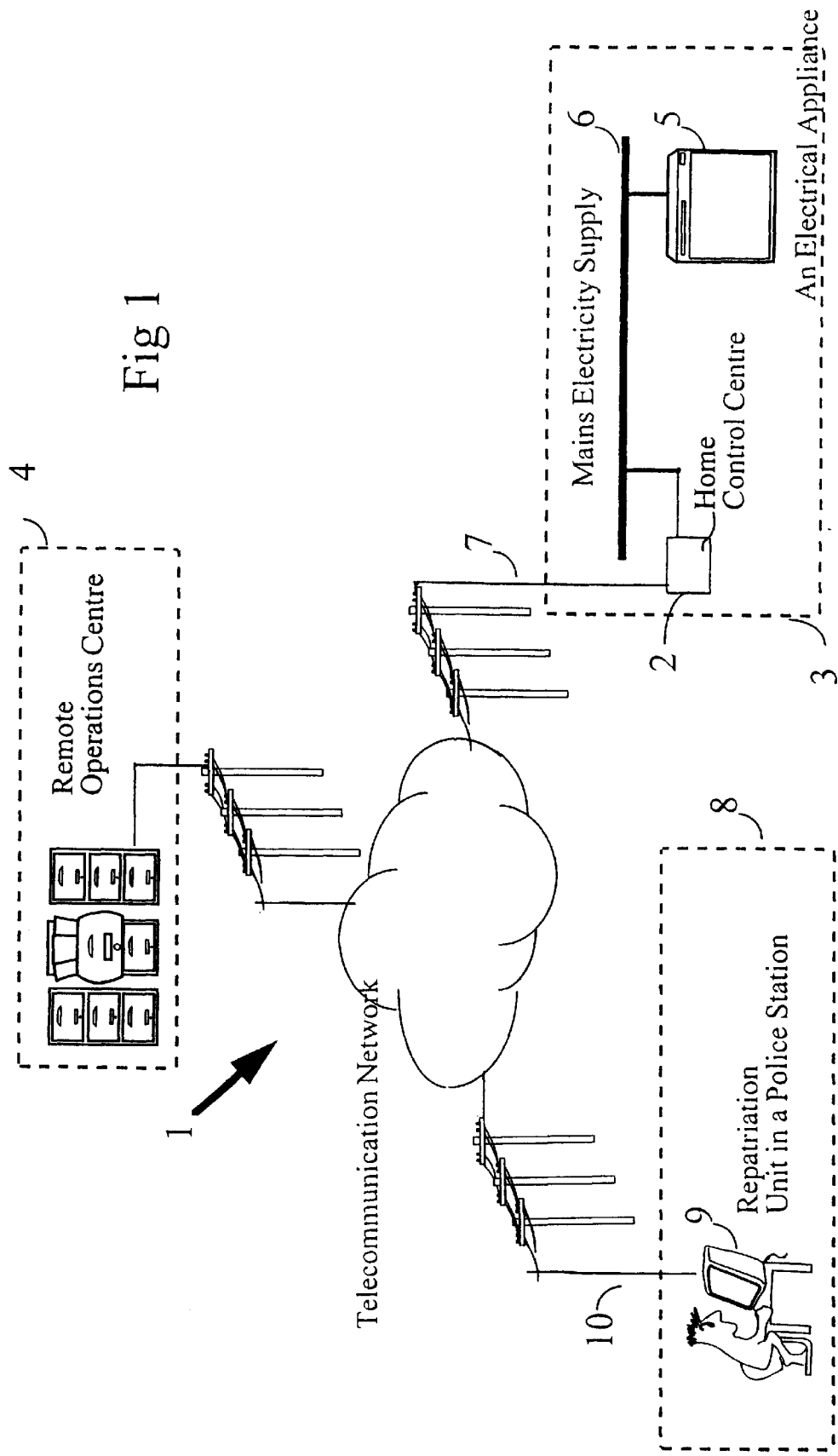
FIG. 1 is a schematic diagram of the entire system.

Referring to FIG. 1, the security system uses a telecommunications network 1 such as the PSTN, for access between a home control centre 2 in a customer's premises 3. A service platform or remote operation centre generally indicated at 4 uses calling line identification generated automatically within the telecommunications network 1 in known manner to identify the source of the particular customer premises 3 when a call is made to it.

Primarily, if an electrical appliance 5 is connected to an electricity supply 6 of the customer premises 3 as hereinafter described a control module in the appliance 5 forwards signalling by way of the mains supply 6 to the home control centre 2 requesting an identity. If the home control centre 2 does not currently hold an identity for the particular piece of appliances connected it will cause seizure of a line 7 to the telephone network and effect connection to the remote control centre 4. The remote control centre 4 forwards a response as hereinafter described.

Finally, as shown in FIG. 1, in official premises, for example in a police station generally indicated at 8, a repatriation unit 9 may be provided. The repatriation unit is arranged such that if a piece of electrical apparatus recovered by the security service is connected to the repatriation unit then by effecting a connection by way of a respective telephone line 10 as identified by the telecommunications network 1 calling line indication information identification of the proper location of the recovered apparatus may be obtained.

Having provided an overview of the system on the basis of FIG. 1 consideration will now be given to the component parts of FIG. 1 and initially referring to FIG. 2, each piece of electrical apparatus to be protected by such a system has in-built during manufacture a process control unit either as part of the unit power supply or as part of other control apparatus therein. For example a television or video recorder may include the process in "child locking circulatory". Thus, generally indicated at 5 is any piece of protected electrical apparatus which may be connected to the domestic electricity supply 6 by way of a plug and socket connection for example (not shown). Thus the mains lead 11 of the protected apparatus 5 is connected to a switched mode power supply 12 and also to a signalling interface 14. The signalling interface 14 uses frequency shift keying over the mains power supply in known manner for the purposes of communicating with the home control centre 2 of FIG. 1.

The process control unit 15, which may be integral with the power supply 12 or may be a part of the operational circuitry shown at 17, is arranged to determine as hereinafter described whether power should be supplied or denied to other operational circuits 17 this capability being generally indicated by switch means 18. It will be appreciated that the process for denying power from the switched mode power supply 12 would not be so simple as a switch 18 which could be easily circumvented and will actually be better protected such that in order to overcome the security arrangements it will be necessary to replace the entire power supply unit or substantial components thereof. The process control 15 has access to data held in a data store 16 the purpose of which will become apparent. The data store 16 is a non-volatile storage element capable of holding an appliance identity, the location identity, one or more unlocking codes and a blanking code as indicated in FIG. 17 hereinafter described. Generally speaking the location code is a 64 bit code unique to the property in which the appliance is installed and which is derived from the CLI and by the remote operations centre of FIG. 1 when a customer subscribes to the service.

The or each unlocking code is a 24 bit code one of which is unique to the customer premises 3. A further unlock code of 24 bits may be provided in a more complex arrangement, the further 24 bit unlock code being unique to the particular electrical apparatus 5. Where a unique code for the apparatus 5 is provided this will be generated on the first occasion in which the appliance 5 is plugged into the electricity supply and will be received in response to a request to the remote operation centre 4 as hereinafter described.

The 24 bit blanking code is unique to the appliance and, as in the unique unlock code, is generated by the remote operations centre 4 in response to receipt of a request from the apparatus 5.

The purpose of the codes is firstly to locate the apparatus, that is to say the 64 bit appliance location code is unique to the home control centre 2 in a customer premises 3 and, once a security aware apparatus 5 is aware of its location, each time it is connected or disconnected from the mains electricity supply 6 its process controller 15 causes FSK interface 14 to transmit the location information and request an unlock code. A unique unlock code for the appliance i.e. the 24 bit unlock code (if any) uniquely provided by the remote operations centre 4 or will be returned by the home control centre 2 to the appliance. Note that the home control centre 2 will only recognise its own location code. Where only house codes are in use the home control centre 2 will return the 24 bit house unlock code by way of the electricity supply line and the FSK interface 14.

If neither the appliance code nor the house code is received by the process controller 15 then power is denied to the operational circuits.

The blanking code, which is unique to an electrical appliance and which is known only to the particular appliance 5 and to the remote operations centre 4 is used to permit the bona fide transfer of security aware apparatus between locations or upon sale of the equipment.

Figure 2:
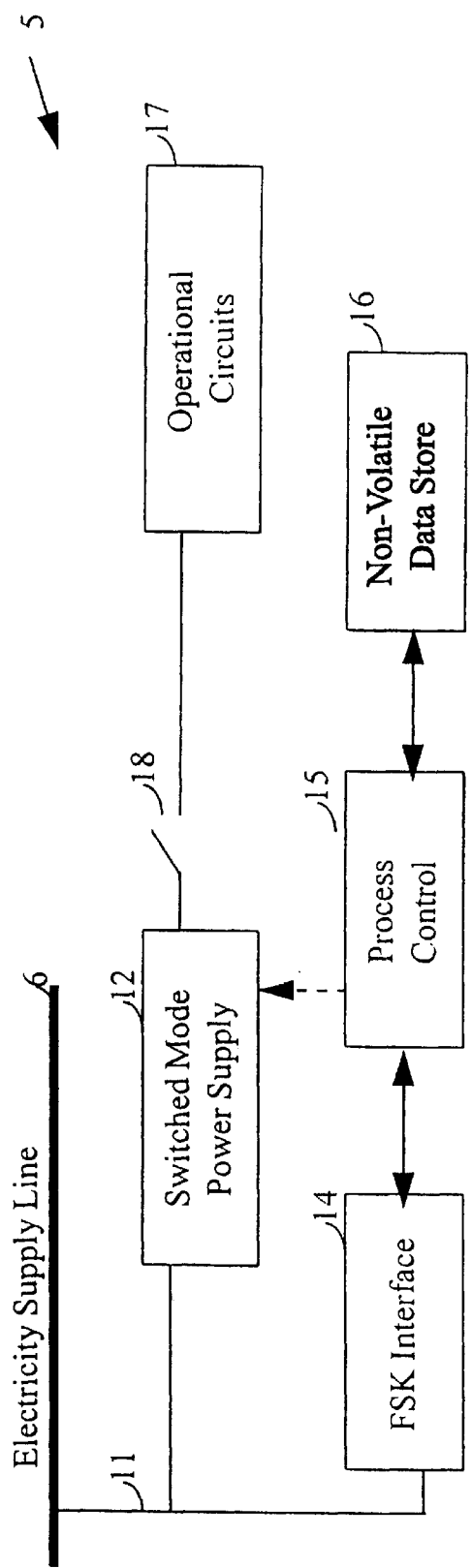
FIG. 2 shows a part of security aware electrical appliance of FIG. 1.
Figure 3:
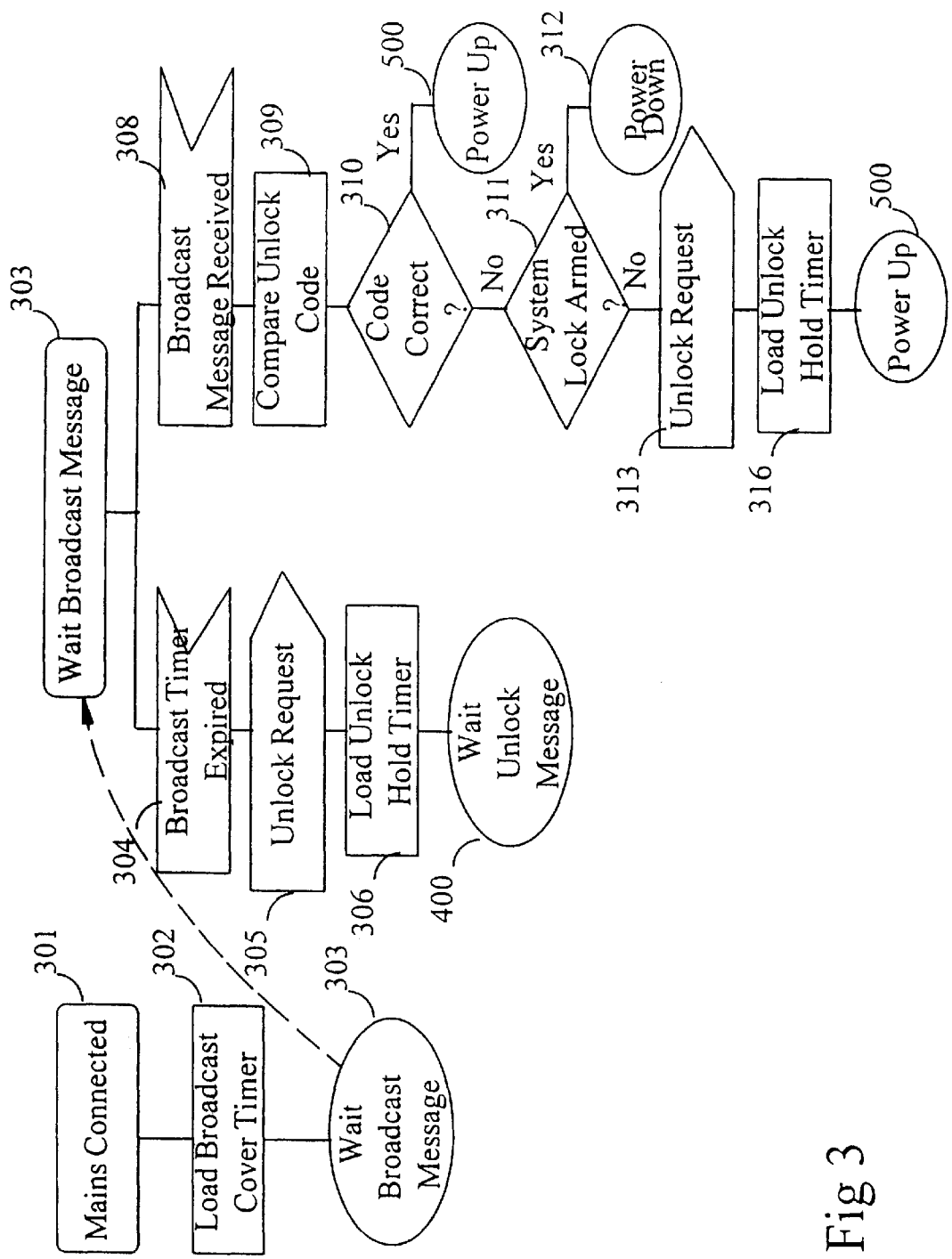
FIGS. 3, 4, 5 and 6 are flow charts relating to the operation of the apparatus of FIG. 2.

Referring to FIG. 3, the operation of the process control function of the security aware apparatus of FIG. 2 will now be described. On connection of power by way of the electricity supply line 6 then a timer "load broadcast cover" timer 302 is started by process controller 15 which now waits to receive a broadcast message by way of the FSK interface 14. The purpose of the broadcast timer is to cover the eventuality where a major power disruption has resulted in a number of security aware appliances in the same customer premises 3 having a reconnection of electricity supply at the same time. If a catastrophic domestic electricity failure has occurred then, as hereinafter described, the home control centre 2 will also have lost electrical power. This will result in an application by the home control centre 2 to the remote operations centre 4 for a reload and the home control centre 2 then causes the broadcast of the 24 bit house unlock code.

Figure 4:
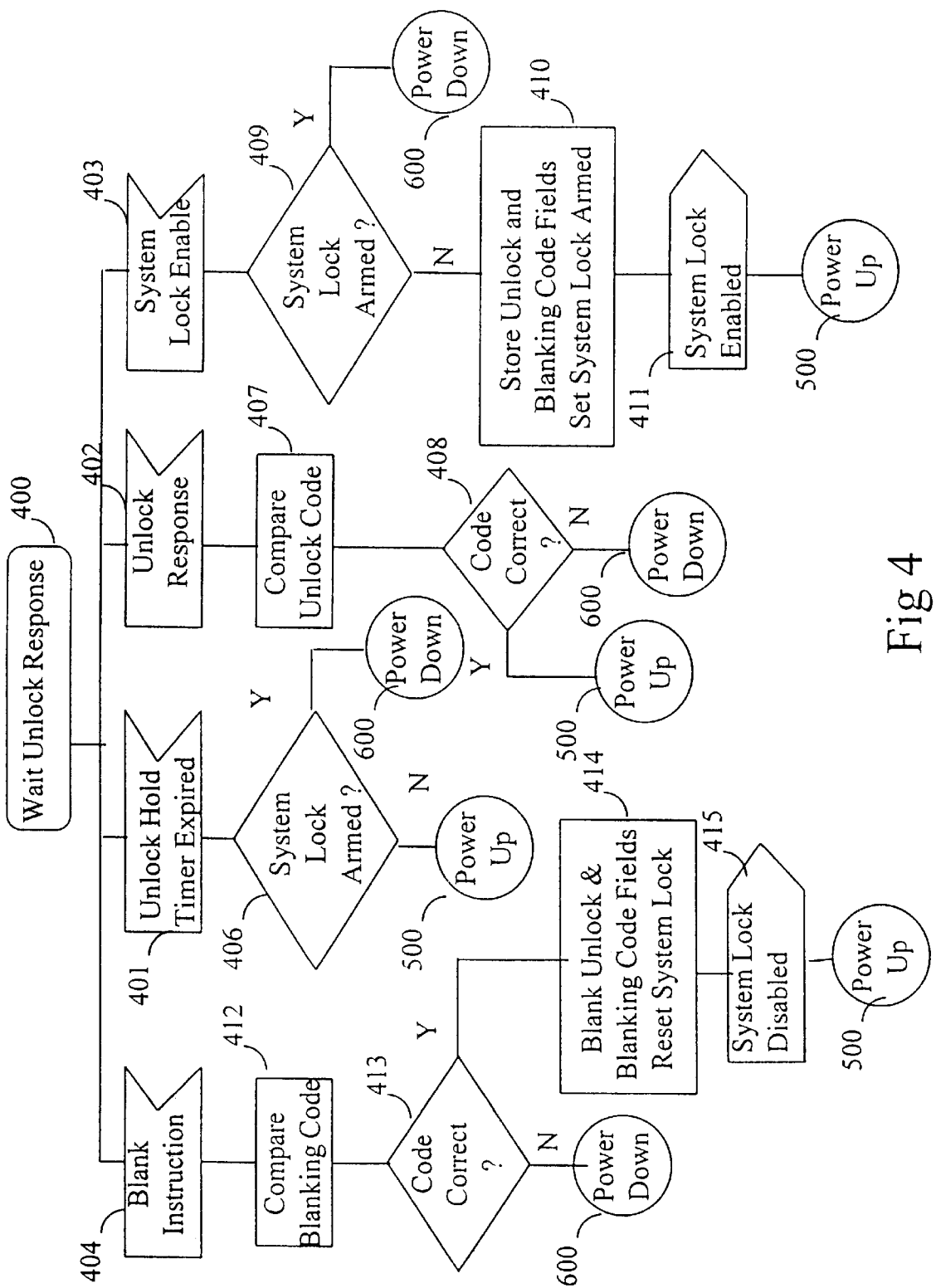
Figure 6:
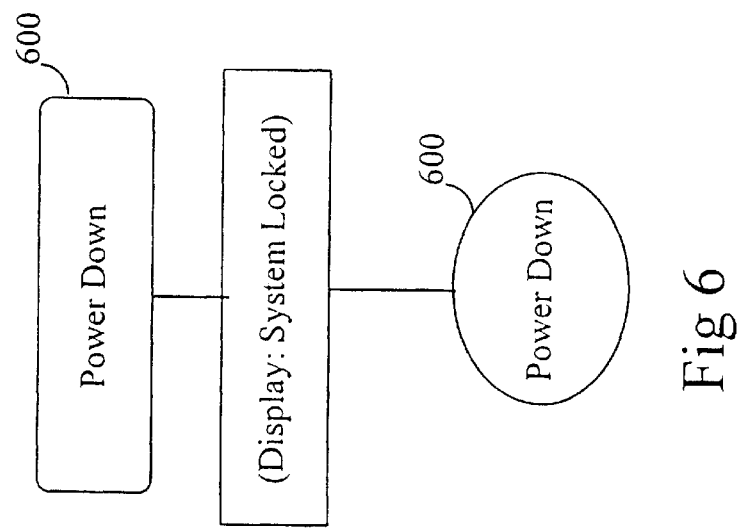

Returning to FIG. 3, the process controller now goes into an interruptable state 303 to wait for the broadcast message. The processor 15 will leave the wait broadcast message state 303 in response to one of two events, a first of which is that the broadcast timer set at step 302 will expire and the path indicated at 304 will now be followed. Once the broadcast timer expires as indicated at step 305 an unlock request is sent through FSK interface 14 to the electricity supply line 6. Note that the unlock request comprises the 64 bit house code as stored in the data store 16. Once the unlock request has been transmitted then an unlock timer is loaded as indicated at step 306 and the processor 15 waits for an unlock message hereinafter described with reference to FIG. 4. Returning now to the previous stable state, that is to say the wait broadcast message state 303, if as a result of catastrophic power failure a system restart has been required then a broadcast message will be received as indicated at step 308, the broadcast message being expected to be a 24 bit house unlock code. This code is compared at step 309 with the house code stored in the data store 16 of the appliance 5 and as indicated at step 310 if the code is correct the power supply 12 is allowed into normal operation through a power up routine described hereinafter with reference to FIG. 5. If an incorrect code is received and the system lock flag of the data store 16 is set to indicate that the particular piece of apparatus 5 is security aware, that is it has previously been connected then the process controller 15 causes the power supply 12 to power down in known manner so that power will not be supplied to the operational circuits 17 of the particular apparatus 5. If at step 311 the system lock is not found to be armed then at step 313 an unlock request will be broadcast in the same manner as at step 305 and an unlock hold timer will be commenced at step 316. Turning now to FIG. 4 the wait unlock response state 400 into which the processor 15 has been placed may be left as a result of either the unlock hold timer expiring 401, an unlock response 402, a system lock enable response 403 or a blanking instruction 404. Thus if the unlock hold timer expires as indicated at step 405 the system lock flag in the associated data store 16 is interrogated at step 406. If the system lock is not in the enabled state, that is to say the apparatus 5 has not previously been coded from the remote operations centre 4 or a subsequent blanking operation has been carried out then the process controller 15 goes into the power up mode. If however the system lock is armed and no unlock response is received then the process controller will enter the power down state and as indicated in FIG. 6 will lock to that state until such time as the apparatus is disconnected from the electrical supply 6 and reconnected in a bone fide situation.

If now the response to the unlock request is an unlock code as indicated at 402 the unlock code is compared at step 407 with data held in the-data store 16 and if the code is correct, then at step 408 the normal power up function occurs. Again if the code received is incorrect then the stable power down state 600 will be adopted. Note that if individual appliance codes are being used the apparatus will only unlock to its unique code once the broadcast timer has expired. If only house codes are in use then the house code and the blanking code is unique. The appliance code and blanking code will not be identical or related to each being individually randomly generated by the remote operations centre if as hereinafter described.

At step 403, if a system lock enable is received in response to the unlock request then at step 409 the system lock flag is interrogated to determine whether it was previously armed and if so this would indicate that the unit has been incorrectly plugged to a home control centre which has no previous record of this particular piece of apparatus 5 and therefore the system enters the power down state 600. If however the system lock is not armed then the unlock and blanking codes including the house code and separate apparatus unlock code, if applicable, are received and stored at step 410 after which at step 411 the system lock enable is set in the data store 16 and a system lock enabled message is transmitted and power up state 500 is entered. A system lock enable response should only be received when the apparatus is first plugged to a home with home control centre facilities or after the blanking field has been correctly activated as a result of an unlock response transmitted incorporating a blank instruction at step 404. The blanking instruction is received from the remote operations centre 4 and blanking instruction will only be transmitted under specific circumstances which a known owning customer will request.

On receipt of a blanking instruction the blanking code is compared at step 412 and provided that it is correct as indicated at step 413 then at step 414 all of the code fields in the data store 16 are blanked and the system lock enable flag is reset so that the apparatus is now in condition for transfer to other premises. Once the blanking of the data store 16 has been completed then the system will enter the power up state 500 in the normal manner.

If however at step 413 an incorrect blanking code is received in response to the unlock request then the system enters the power down stable state 600.

Note that once a correctly identified blanking instruction has been received the appliance is deregistered from the home control centre list at the remote operations centre 4 which will cause the home control centre 2 of the customer premises 3 to be updated as hereinafter described. The registration may be performed in the home control centre 2 on receipt of the system lock disabled message transmitted by the FSK interface 14 at step 415.

Figure 5:
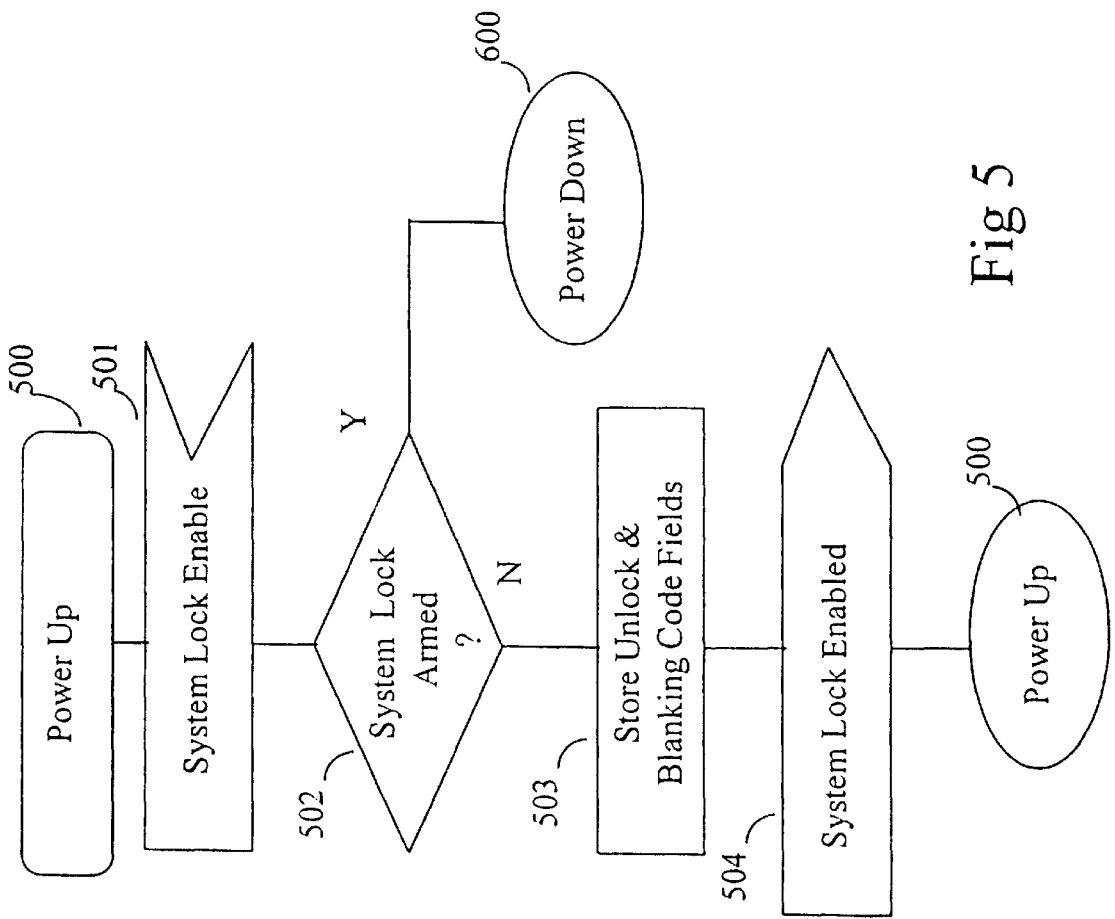

FIGS. 5 and 6 show the two stable states of piece of apparatus 5 being respectively the power up state 500 and a power down state 600. In the power down state 600 the apparatus is effectively disabled and none of the operational circuits 17 will receive power. Where apparatus includes an appropriate display unit then as the microprocessor locks to prevent the apparatus functioning it may display an appropriate message such as system lock. In the power up mode 500, the power supply 12 will be supplying current to the operational circuit 17 in known manner but the process control 15 continues to monitor the FSK interface 14 for any false system lock enable states input. Note that the system lock enable message includes the electronic serial number of the apparatus which prevents false triggering to any given system lock enable message.

Thus if a system lock enable is received at step 501 the process controller 15 checks to determine whether the system lock is already armed in the data store 16 and if not at step 503 will store the unlock and blanking code fields received and will enable the system lock at step 504 and send an acknowledgement. The system then returns to the power up stable state 500.

Summarising then the operation of a security aware appliance 5 is controlled by messages transmitted by a process controller 15 through an FSK interface 14 to the electricity supply line 6, the FSK interface 14 also receiving messages whether directly from a home control centre 2 or from a remote operations 4 by way of a home control centre 2 for us e by the process controller 15. The message format and messages transmitted by the appliance 5 are summarised in the following table:

TABLE 1

| Message Name | Direction | Parameters |
| --- | --- | --- |
| Unlock Request | Outgoing | message type, message reference, equipment type, electronic serial number, appliance location code, checksum |
| System Lock enabled | Outgoing | message type, message reference, checksum |
| Broadcast Unlock Code | Incoming | message type, unlock code, checksum |
| Blank Instruction | Incoming | message type, message reference, blanking code, checksum |
| Unlock Response | Incoming | message type, message reference, unlock code, checksum |
| System Lock Enable | Incoming | message type, message reference, electronic serial number, appliance location code, unlock code, blanking code, checksum |

The parameters used (and hence stored in the data store 16 of the security aware appliance 5) are as follows:

| | |
|---|---|
| Message Type | 8 bit field indicating the type of message being sent |
| Message Reference | 8 bit field used to link a series of message exchanges into a session |
| Equipment Type | 64 bit field characterising the manufacturer and product uniquely. First 16 bits identify the manufacturer and will be controlled and issued by a remote operations centre body. The latter 48 bits are manufacturer allocated apparatus and model identities and will be entered into the system data store of a security aware apparatus during manufacture. |
| Electronic Serial Number | 64 bit field uniquely identifying this product from other equipment of the same type (as identified by the previous field) |
| Unlock Code (1) | 24 bit field carrying the unlock code for the property (normally generated by the remote operations centre 4 on a per property basis) |
| Unlock code (2) | 24 bit field carrying a unique unlock code for the particular apparatus (if used) generated by the security provider (remote operations centre) as per appliance basis |
| Blanking Code | 24 bit field carrying a blanking code for the appliance (generated by the security provider on a per appliance basis) |
| checksum | 16 bit checksum allowing detection of potential message corruption |

Having considered the components and action of a security aware apparatus 5, consideration will now be given to the home control centre 2 of FIG. 1 in a customer premises 3.

Figure 7:
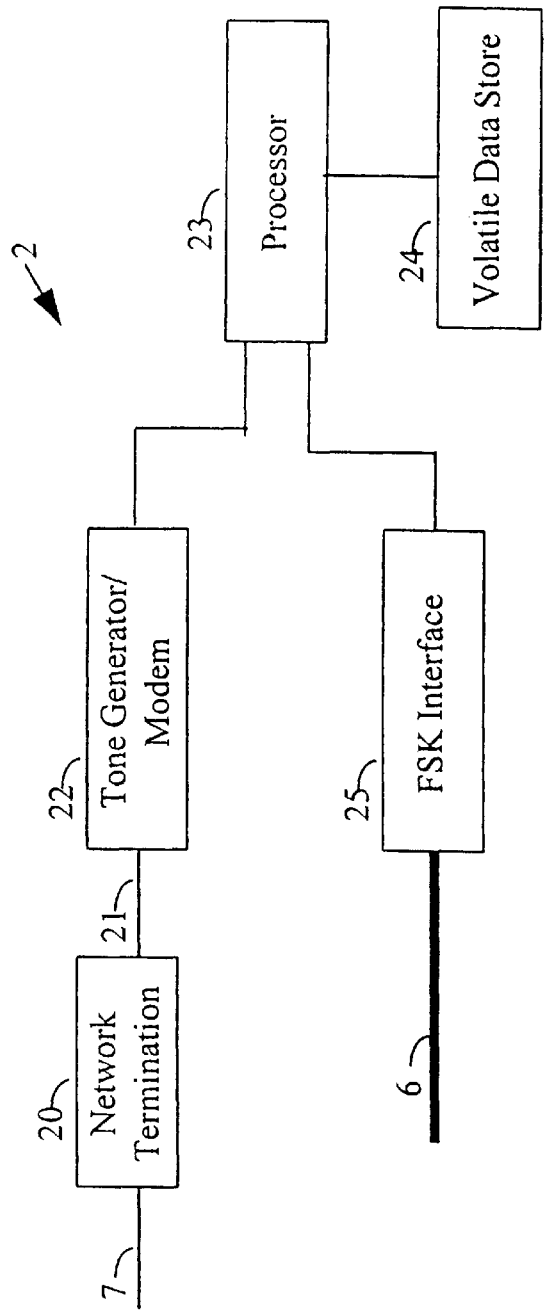
FIG. 7 is a block schematic diagram of the home control centre of FIG. 1.

Referring to FIG. 7, the home control centre 2 is arranged for connection by way of a network termination point, such as a telephone company's wall socket, 20 which is connected to the telephone line 7. Thus, the equipment will be provided with a suitable connector 21 which is coupled to a modem 22 for receiving signals from the telephone line 7 and transmitting signals thereto. The modem may include a tone generator to enable calls to be set up through the network under control of a processor 23. The processor has an associated data store 24 which is a volatile data store. The purpose of the volatile data store is to hold a list of equipments and their respective codes received from the control centre 4 of FIG. 1. This data will however be lost if at any time the equipment is disconnected from the electricity supply line 6. The power supply arrangements for deriving power for the processor and data store modem and the like is not shown since these are of known type. An FSK interface 25 is provided between the electricity supply line 6 and the processor 23 to enable the processor to monitor for signals from security aware apparatuses 5 and to transmit responses thereto.

Turning now to FIG. 8, on first connection of mains power to the electricity supply line 6 and on each subsequent connection of power to the home control centre 2 the processor 23 causes a call to be established by the tone generator 22 through the telecommunications network to the remote operations centre 4. A modem request for an equipment list is then transmitted and the remote operations centre 4 using CLI of the customer premises 3 responds with an equipment list as hereinafter described. In effect the equipment list identifies each apparatus registered as present together with its individual unlocking code (if any) and the house code previously mentioned. Thus in a single modem exchange as indicated at 801 the request is transmitted at 802 and an equipment list is received at 803 after which the network connection is released.

Note that if at any time power to the system fails data held identifying the house code and apparatus is immediately lost from the data store 24 and on reconnection the process is carried out again. In this way, even if the home control centre 2 is stolen along with property in the customer premises 3 it will not be useable to provide unlocking codes for the appliances 5. However, the home control centre 2 will include programmable storage for holding the access code (telephone number) to the remote operator centre 4.

Assuming that there are items in the list, as indicated at step 804, the house unlocking code is broadcast at step 805 for comparison in individual appliances 5 as described hereinbefore with reference to FIG. 3.

If however the list is empty the home control centre will move to its normal main state 900 which is its primary stable state at all times when power is connected.

Figure 9:
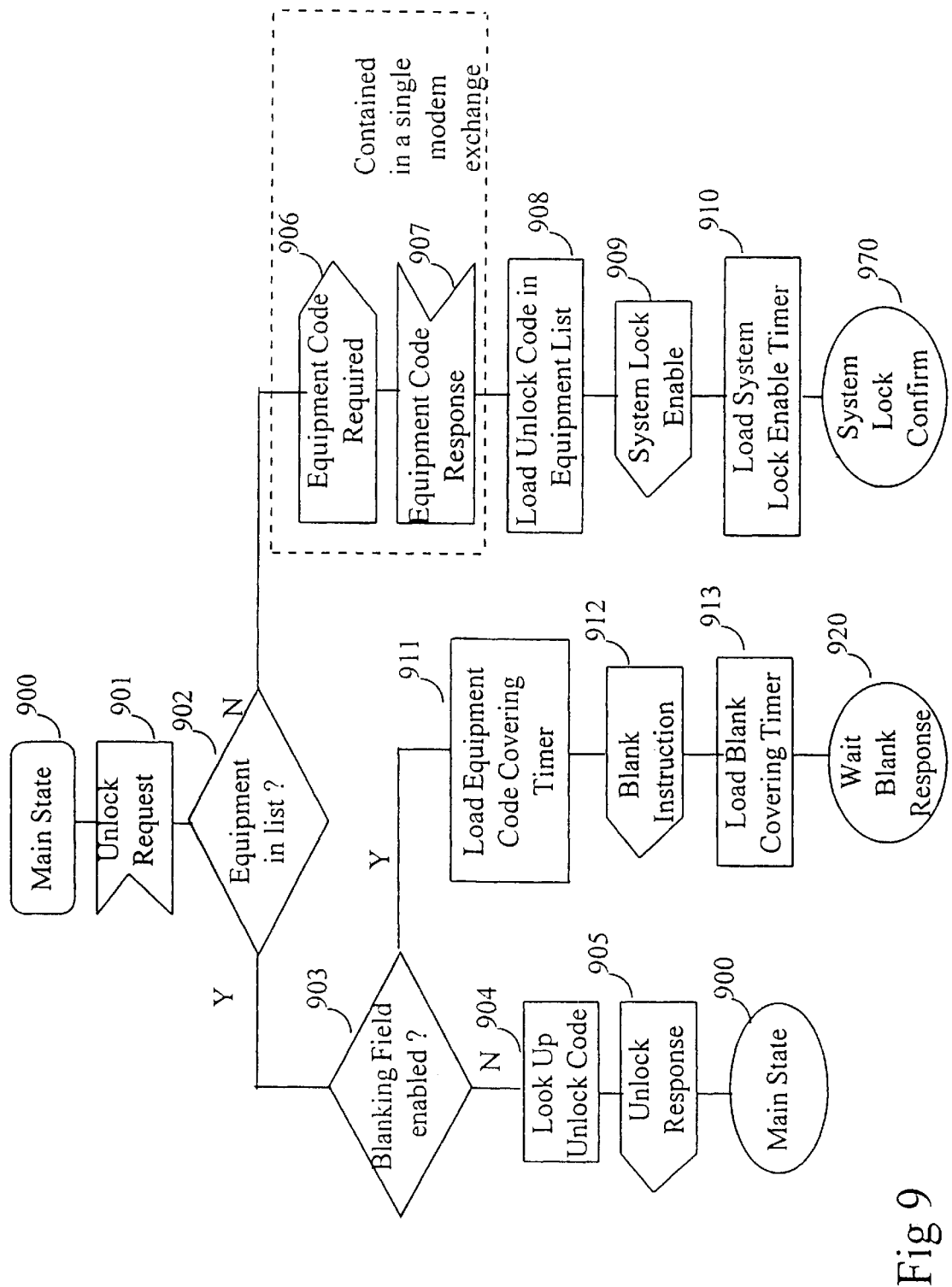

Turning now to FIG. 9, the FSK interface 25 of FIG. 7 monitors the electricity power line 6 for an unlock code request received from one of the security aware appliances 5 in the customer premises 3. On receipt of an unlock request, as indicated at step 901, the received appliance identity code is compared with the data held in the data store 24 to determine whether the equipment is currently listed as present and if so interrogates a blanking field associated with the particular piece of apparatus to determine whether that field is set, this occurs at step 903. For the avoidance of doubt it is noted that the blanking field for a piece of apparatus will only be enabled if the customer has previously had an interchange with the remote operations centre 4 to request removal of a piece of equipment from the list.

In the normal course of events the blanking field will not be enabled and the processor 23 looks at the appropriate unlock code for the requesting apparatus (or the house code where individual unlock codes are not in use), at step 904, and uses the FSK interface 25 to transmit the unlock response (namely the unlock code) at step 905 prior to returning to its normal state.

Returning to step 902, if the apparatus 5 forwarding the request is not present in the equipment list held in the data store 24, this will indicate that the appliance 5 has not previously been plugged into a system in the customer premises 3. The processor 23 therefore causes the establishing of a call through the networks as previously referenced and using the modem 22 interchanges with the remote operations centre 4 data identifying an equipment code request, at step 906, which request includes some identification of the apparatus plugged in, for example the manufacturing code, type and serial number as previously described. Causing the modem 22 to forward this information results in a response from the operations centre including an unlock code and blanking code which at step 909 is transmitted by way of the FSK interface 25 to the electricity supply line 6 for receipt by the process control 15 via FSK interface 14 of FIG. 2 causing the appropriate response of FIG. 4 i.e. the unlock response chain beginning at step 403 to be followed.

Note that the codes and the equipment are added to the list in the data store 24. Now at step 910, a timer is started awaiting the return of a system lock enable hereinafter described with reference to FIG. 10.

Once the home control centre 2 is in the system lock confirm state 970 it will only leave after if the timer, set at step 910, expires as indicated at step 971 in which case it repeats the transmit of system lock enable at step 972 and recommences the timer or on receipt of a system lock enable message as transmitted at step 411 of FIG. 4. Note that if the system lock is armed, as indicated at step 409 of FIG. 4 in the particular piece of apparatus, then it is likely that the entire system installed in the customer premises 3 will lock up until such time as the appliance 5 is disconnected from the system.

However if the system lock enable signal is returned, as indicated at step 974, then the list in the data store 24 is marked accordingly at step 975 and the system returns to its main state 900 after transmitting a confirmation message to the remote operations centre 4.

Returning now to FIG. 9 and particularly to step 903, if as hereinbefore referred the blanking field has been enabled as a result of a customer application to the remote operations centre 4, then after step 903 a timer is loaded at step 911, following which the unlock and blanking codes are transmitted by way of the FSK interface 25 of FIG. 7 to the electricity supply line 6 this being received by the appropriate FSK interface 14 of FIG. 2 in apparatus to be blanked. A blank covering timer is loaded at step 913 after which the equipment enters a wait blank response state at 920. If the blank covering timer expires prior to receipt of a response from the apparatus 5 which is to be blanked then the system simply returns to the main state since this would indicate that an incorrect code has been identified at step 412 of FIG. 4.

However, if the correct blanking code has been transmitted to a piece of electrical apparatus 5 then a blank response, transmitted at step 415 of FIG. 4, will be received as indicated at step 922 of FIG. 11. Once the blank response has been received from the piece of apparatus indicating that the security aware apparatus concerned is now clear for transfer to other premises it is removed at step 923 from the list held in the data store 24 and a call is established by way of the network to the remote operations centre 4.

In a single modem interchange the processor 23 causes the transmission of a message indicating that the blanking function has been completed and will receive from the remote operations centre a revised listing for storage in the volatile data store first acknowledging that blank response has been acknowledged. This occurs at steps 924 and 925 of FIG. 11. If the remote operations centre is aware that adjacent properties or properties likely to share a common electricity supply such as in households divided into apartments but having separate telephone line 7 and home control centres 2, three bits of the message type will be used to identify messages directed to a particular home control centre 2, and the home control centre 2 will use the particular message type on first set up to program a communications channel identified by those first three bits to security aware appliances in particular premises.

Intelligence may be built into the remote operations centre 4 enabling the system to cause blanking of apparatus wrongly allocated to a particular home control centre and subsequent correction when the blanked apparatus is reconnected. Thus, for example, if a domestic power failure occurs in one property subsequent reconnection will cause the home control centre 2 to broadcast its own house code but apparatus connected on the same power circuit will time out and request a code through the adjacent home control centre 2. This may be identified to cause reallocation.

The situation mentioned is thought unlikely where correct balancing of local power supplies occurs. Suitable inductive correction in mains electricity meters should avoid such problems being significant.

The message formats and messages incoming and outgoing to and from the home control centre 2 are as shown in Table 2 in which the remote operations centre 4 is identified by the legend ROC and a piece of electrical apparatus 5 is identified as SWA.

TABLE 2

| Message Name | Direction | Parameters |
| --- | --- | --- |
| Request Equipment List | Outgoing (to ROC) | message type, checksum |
| Equipment Code Required | Outgoing (to ROC) | message type, equipment type, electronic serial number, checksum |
| HCC_Blank Complete | Outgoing (to ROC) | message type, equipment type, electronic serial number, checksum |
| Equipment Stored Confirm | Outgoing (to ROC) | message type, equipment type, electronic serial number, checksum |
| Broadcast Unlock Code | Outgoing (to SWA) | message type, unlock code, checksum |
| Blank Instruction | Outgoing (to SWA) | message type, message reference, blanking code, checksum |
| Unlock Response | Outgoing (to SWA) | message type, message reference, unlock code, checksum |
| System Lock Enable | Outgoing (to SWA) | message type, message reference, electronic serial number, appliance location code, unlock code, blanking code, checksum |
| Receive Equipment List | Incoming (from ROC) | message type, number of entries, appliance location code, unlock code, ROC Phone number 1, ROC Phone number 2, [1 . . . number of entries] (equipment type, electronic serial number), checksum |
| Equipment Code Response | Incoming (from ROC) | message type, appliance location code, unlock code, blanking code, checksum |
| HCC_Blank Response | Incoming (from ROC) | message type, checksum |
| Unlock Request | Incoming (from SWA) | message type, message reference, equipment type, electronic serial number, appliance location code, checksum |
| System Lock Enabled | Incoming (from SWA) | message type, message reference, checksum |

The parameters used in the above are as follows:

| | |
| --- | --- |
| Message Type | 8 bit field indicating the type of message being sent |
| Message Reference | 8 bit field used to link a series of message exchanges into a session |
| Equipment type | 64 bit field characterising the manufacturer and product uniquely, first 16 bits characterising the manufacturer and will be controlled and issued by the remote operations centre, the latter 48 bits being under manufacturer control |
| Equipment Serial Number | 64 bit field uniquely identifying the product from other equipment of the same type. |
| Appliance Location Code | 64 bit field uniquely identifying the security provider (first 24 bits identifying the remote operations centre) and the property within the domain, that is the customer premises 3 identified by the latter 40 bits |
| Unlock Code | 24 bit field carrying the unlock code for the property (house code) or the unlock code for the apparatus within the property as appropriate |
| Blanking code | 24 bit field carrying the blanking code for the appliance generated by the operations centre on a per appliance basis |
| Number of Entries | 16 bit field indicating the number of appliances protected at customer premises 3 |
| Checksum | 16 bit checksum indicating potential message corruption. |

Figure 13A:
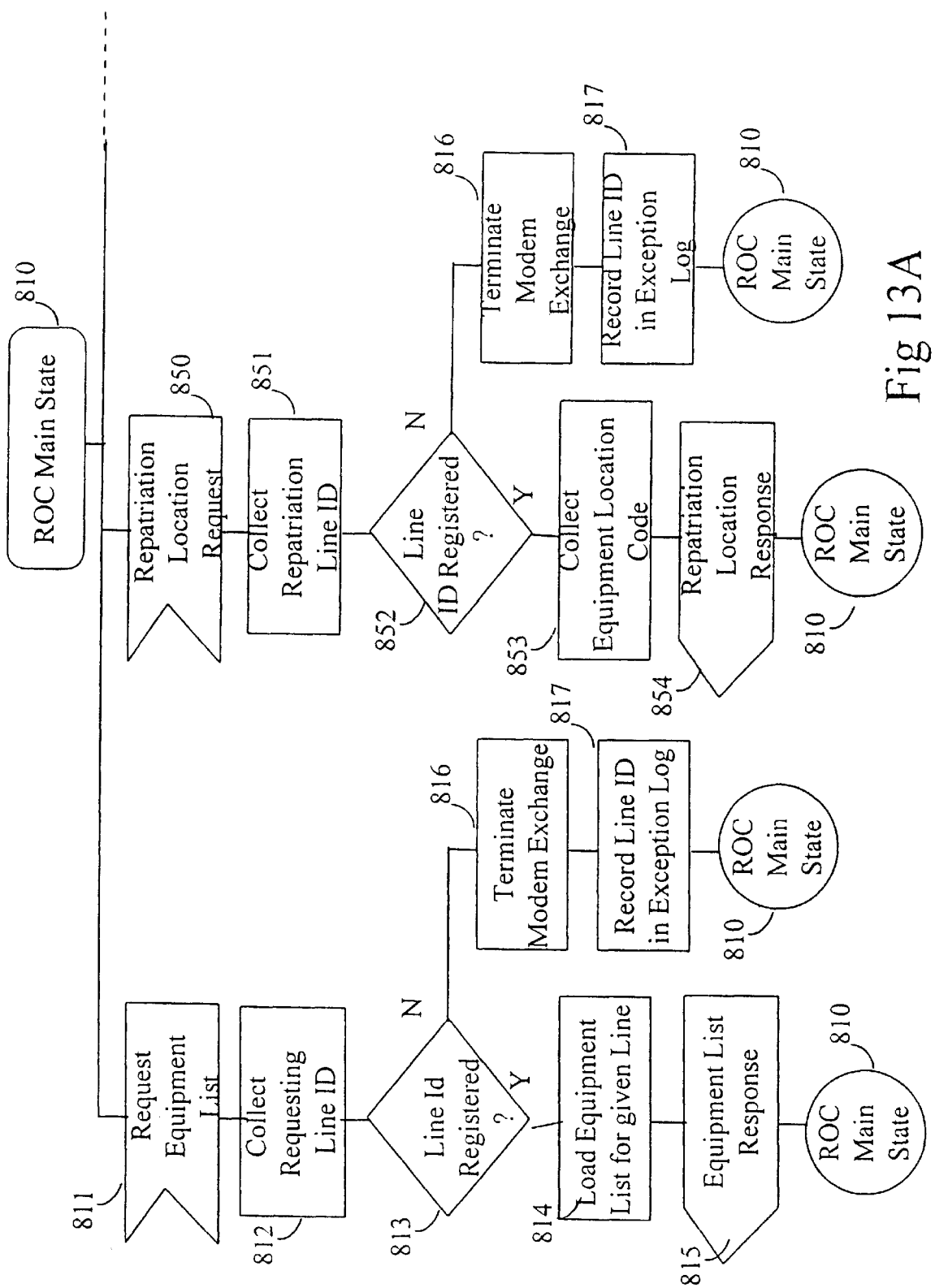
FIG. 13 comprising FIGS. 13A and 13B when assembled as shown as FIG. 13C is a flow chart used in describing the operation of the apparatus of FIG. 12.

Referring now to FIG. 12 the remote operations centre for of FIG. 1 essentially comprises a mainframe computer 30 and a rapid access data store 31. A calling line identity circuit 32 responsive to FSK or other signals from the telecommunications network to identify the source of an incoming call is also provided. Incoming telephony lines 37 (only two of which are shown) are selectively switched to modems 33 (only one of which is shown) under control of the computer 30 to effect receipt of signalling from home control centres 2 in customer premises 3 and to respond using an appropriate messaging protocol. The operation of the computer 30 will now be described with reference to FIGS. 13A and B when assembled as shown in FIG. 13C.

Multiple instances of the ROC main state which is the sole state of the remote operations control centre 4 may be running at any time to handle a multiplicity of calls which may arrive by way of the telephone lines 37. Considering just a single instance of the operation of the remote operation main control state 810, on receipt of an incoming call signalling by way of a connected modem 33 will indicate the request which has been received from the home control centre 2 of a customer premises 3 or from a repatriation unit 8 hereinafter described. The most likely input from a home control centre 2 is that shown in 811 that is to say a modem signal requesting an equipment list from the ROC. The CLI circuit 32 will provide line identity to the processor 30 as indicated at step 812 and the processor will compare the requesting line identity with a list of registered line identities held in data store 31. If at step 813 a registered line identity is found then the equipment list for that line together with the house code and individual equipment unlocking codes (if appropriate) and any blanking information are retrieved from the data storage unit 31. This information is then passed by way of the modem 33 at step 815 for use by the home control centre 2 as indicated in FIG. 8.

If however, at step 813 a request has been received from an unregistered line at step 816 the interchange of data with the remote customer is terminated and the line identity and any further information received in the equipment list request are recorded in an operations and maintenance exception log which may be used to determine attempted fraudulent use of the system or to identify the location of a potentially stolen control centre unit 2.

As has been mentioned at step 814 any blanking code request is returned to the home control centre for use at step 903 of FIG. 9. The blanking field together with the stored blanking code for a particular piece of equipment (or for all of the equipment at a designated location) will only be present as a result of either the action of control centre staff in response to a customer's request or as a result of a controlled access using multifrequency tones by way of the telephone line to provide personal identification numbers (PIN) or other security so that the customer can request blanking of one or more pieces of security aware apparatus 5.

Considering now an equipment code request from a home control centre 2, when the request is noted as indicated at 820 the CLI is obtained at step 822 and as previously described is compared with valid line identities in the data store 31. (Step 823). Again an invalid line identity will be handled in the same manner as steps 816 and 817 while on receipt of a valid identification the location code for the particular customer premises 3 is loaded from the data store 31 and random blanking codes and/or unlocking codes dedicated to the particular piece of equipment are generated at step 25 and temporarily stored. An equipment cover timer is loaded at step 826 and at step 827 the code response is transmitted by way of the modem 33 to the home control centre. The system now waits either for an equipment store confirm message from the home control centre 2 as indicated at FIG. 10 in which case as indicated at step 828 on detection of the equipment store confirm the equipment cover timer is stopped at step 829 and the appropriate list for the registered line identity is updated in the data storage unit 31 with the identity of the new piece of equipment together with it's appropriate blanking and unlocked codes as generated previously. If however, the equipment cover timer expires as indicated at step 830 then the system at step 831 restarts the timer and makes a further attempt at step 832 to forward the equipment code response to the home control centre 2.

The final incoming signal from a home control centre 2 at a customer premises 3 is that of an HCC blank complete detected at steps 835 which comes back as a result of blanking being completed at a home control centre as indicated at steps 924 and 925 of FIG. 11. On receipt of the HCC blank complete indication from a home Control Centre 2 to the line ID is collected at step 836 and at step 837 the usual check is made to ensure that this is from a valid line identity. Again steps 816 and 817 in which the modem exchange is terminated and the line identity and other information recorded in an exception log is provided for non-registered lines.

Once the check on the identity has been completed, the appropriate record is located in the data store 31 and the particular piece of equipment is deleted from the equipment list at step 839. A HCC blank response is transmitted at step 840 which response may include a revised complete equipment list for the given line if required.

A further advantage of the present invention is the ability to identify from a stored location code that is the house location code, of a piece of apparatus the origin of a wrongly located appliance. Thus, security forces or police might be provided with repatriation units whereby recovered apparatus can be identified.

Thus, if the remote operations centre 4 receives a repatriation location request 850 the repatriation line identity is collected from the CLI interface 32 and the usual check to ensure that the line is registered as a repatriation line is carried out at step 852.

If the line is not registered for repatriation identity purposes the exchange of data via the modem 33 is terminated and the line identity and other information concerning the transaction is transferred to the exception log at step 817.

Assuming that the repatriation location request originates from a valid location as identified at step 852, the equipment location code received is used to look up in the data store 31 address details for the original source of the apparatus 853 which information is transmitted by way of the modem at step 854 to the repatriation equipment hereinafter described.

While not included in the flowcharts of FIG. 13 it will be appreciated that more complex functions are readily provided by the system. Thus for example when an equipment code is required at step 820 the system may be adapted to receive the manufacturers code, equipment type and serial number from the security aware apparatus being installed at the customer premises 3. This information may be used to access manufacturers databases or distributors databases to ensure that the equipment is of a bona fide origin.

Bona fide registered equipment repairers may be permitted to receive on a single call an unlocking code for a piece of security aware apparatus but would not be allowed to receive a blanking code such that so long as the apparatus remained in the possession of the repairer it could be unlocked for the purposes of repair but could not be blanked for onward distribution.

Timed locking of apparatus could also be provided such that if customer premises were not being occupied or parents wish to restrict access to particular pieces of equipment then temporary locking could be provided on request. Thus any request for an equipment list arising from the designated premises, if the home control centre 2 detected a request from a piece of apparatus not included in the list might include a return list indicating that the apparatus was to remain locked.

Release of the locked apparatus could only occur on a subsequent request for an equipment list after the expiry time set for unlocking. The following message formats shown in Table 3 apply at the remote operations centre.

TABLE 3

| Message Name | Direction | Parameters |
| --- | --- | --- |
| Request Equipment List | Incoming | message type, checksum |
| Equipment Code Required | Incoming | message type, equipment type, electronic serial number, checksum |
| HCC_Blank Complete | Incoming | message type, equipment type, electronic serial number, checksum |
| Equipment Stored Confirm | Incoming | message type, equipment type, electronic serial number, checksum |
| Repatriation Location Request | Incoming | message type, appliance location code, equipment type, electronic serial number, checksum |
| Receive Equipment List | Outgoing | message type, number of entries, appliance location code, unlock code, ROC Phone number 1, ROC Phone number 2, [1 . . . number of entries] (equipment type, electronic serial number), checksum |
| Equipment Code Response | Outgoing | message type, appliance location code, unlock code, blanking code, checksum |
| HCC_Blank Response | Outgoing | message type, checksum |
| Repatriation Location Response | Outgoing | message type, owner's name, [1 . . . 3] address line, telephone number, checksum |

The parameters used in the above are as follows:

| | |
| --- | --- |
| Message Type | 8 bit field indicating the type of message being sent |
| Message Reference | 8 bit field used to link a series of message exchanges in to a session |
| Equipment Type | 64 bit field characterising the manufacturer and product uniquely First 16 bits characterise the manufacturer under control of a central domain. The later 48 bits are under manufacturer control. |
| Electronic serial Number | 64 bit field uniquely identifying this product from other equipment of the same type. |
| Appliance location Code | 64 bit field uniquely identifying the remote operations centre (first 24 bits) central domain controlled) and the property (later 40 bits under control of the remote operations centre) |
| Unlock code | 24 bit field carrying the unlock code for the property (generated by the remote operations centre on a per property basis); or 24 bit field carrying an unlock code specific to the equipment (generated by the remote operations centre) |
| Blanking code | 24 bit field carrying blanking code for the appliance generated by the remote operations centre on a per appliance basis |
| Number of entries | 16 bit field indicating the number of appliances protected at the selected property |
| Owners name | 20 ASCII characters |
| Address line | 20 ASCII 2 characters |
| Checksum | 16 bit checksum indicating potential message corruption |

Figure 14:
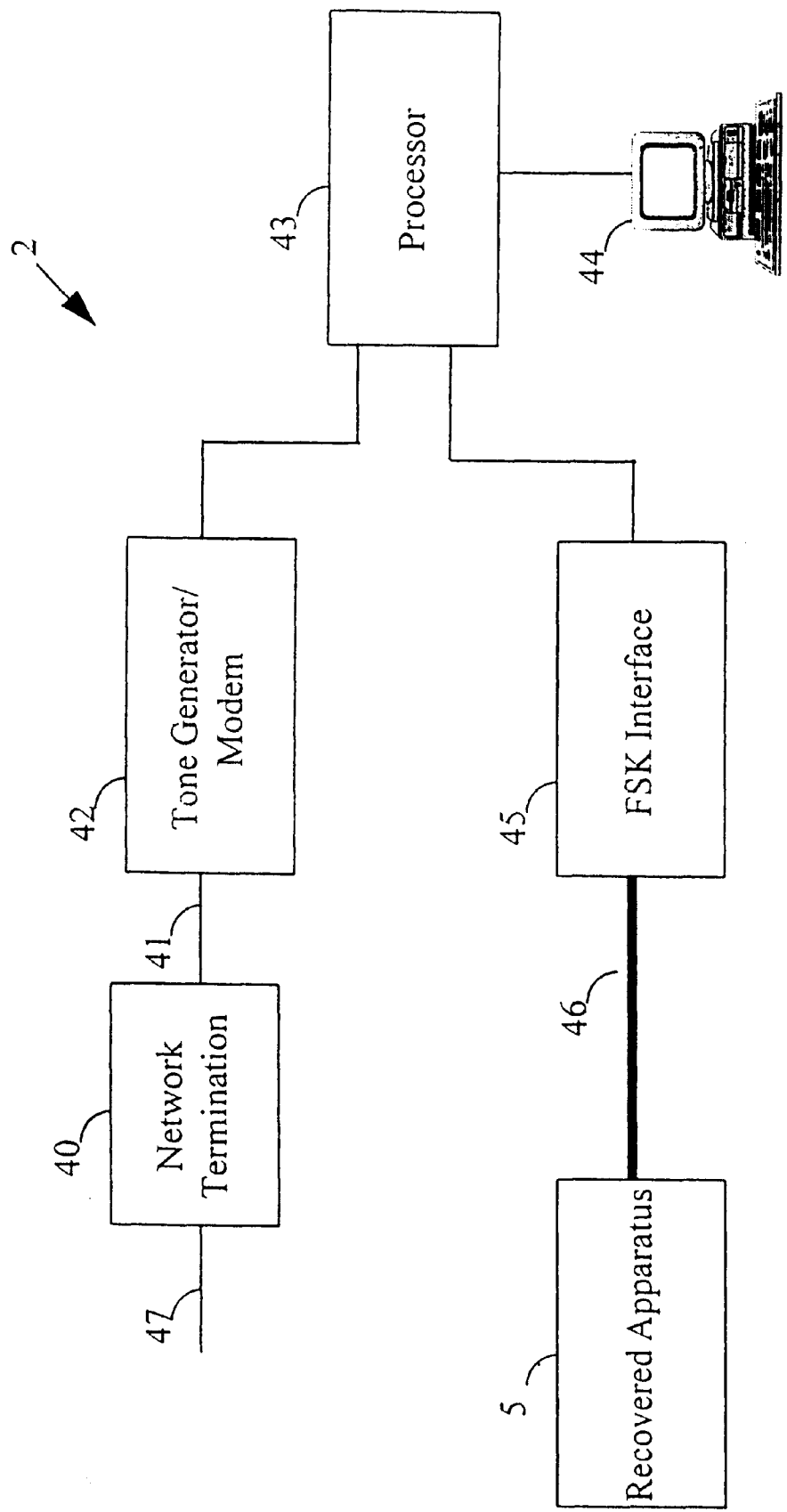
FIG. 14 is a block schematic diagram of repatriation unit of FIG. 1.

Referring now to FIG. 14, repatriation unit 8 is similar in form to a home control centre 2 and has a connection to the communications line 47 by way of a network termination 40 connected via a standard communications line 41 to tone generator/modem 42 which is under control of a processor 43.

The processor 43 has a communications link to a FSK interface 45 which is connected to a mains power lead 46 having a socket to which recovered apparatus 5 can be connected. A man-machine interface having a visible screen 44 is also provided.

Figure 15:
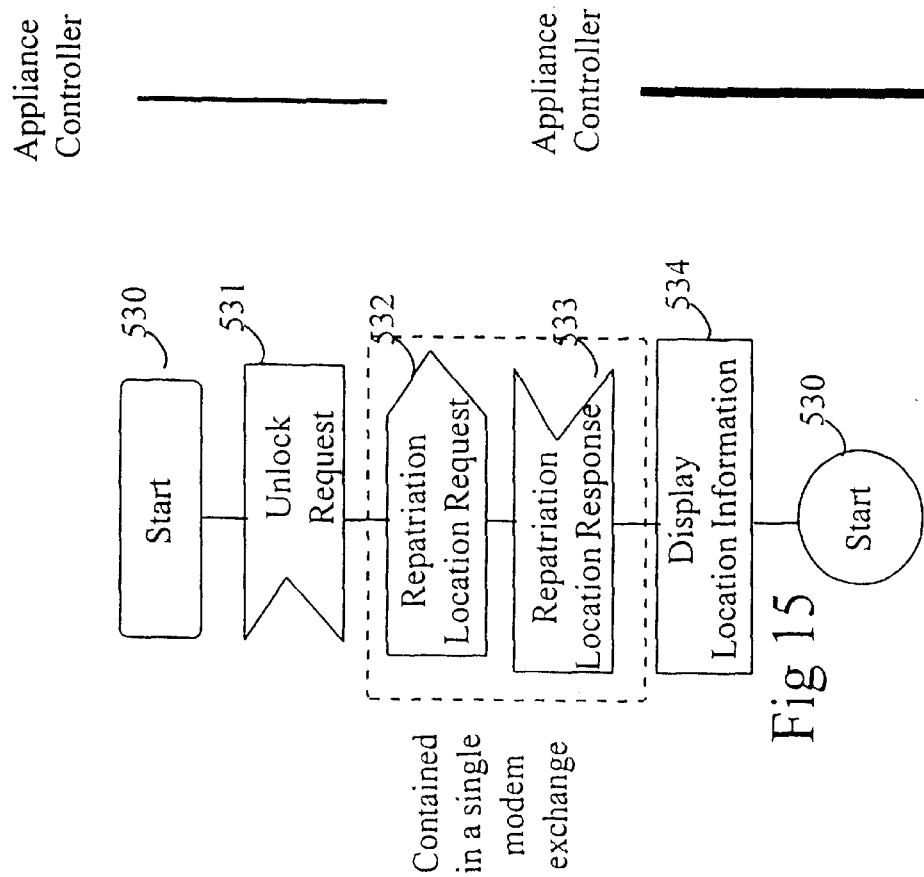
FIG. 15 is the flow chart used in the description of the operation of the apparatus of FIG. 14.

Referring now to FIG. 15, if a piece of recovered apparatus 5 is security aware and is connected to the power point on the power lead 46 as indicated with reference to FIG. 3 at step 3 13 it will forward and unlock request particularly if the FSK interface 45 transmits an invalid broadcast code message. If a broadcast message is not transmitted then when the recovered apparatus is connected to the mains power, it's broadcast time will expire and at step 305 it will forward an unlock request which is received by processor 43 at step 531 thus initiating a modem exchange between the processor 43 and the r emote operations 4. Thus, at step 532 the repatriation location request is transmitted to the remote operations centre 4 and as hereinbefore described a repatriation location response will be received at step 533. The information contained in the repatriation location response is then displayed on the screen 44 at step 534 allowing the home location of the recovered apparatus 5 to be identified.

Message formats used at the repatriation centre are shown in table 4.

TABLE 4

| Message Name | Direction | Parameters |
| --- | --- | --- |
| Repatriation Location Request | Outgoing (to ROC) | message type, appliance location code, equipment type, electronic serial number, checksum |
| Repatriation Location Response | Incoming (from ROC) | message type, owner's name, [1 . . . 3] address line, telephone number, checksum |
| Unlock Request | Incoming (from SWA) | message type, message reference, equipment type, electronic serial number, appliance location code, checksum |

In table 4 above the abbreviation ROC refers to the remote operations centre 4 whilst the abbreviation SWA refers to security aware apparatus namely the recovered apparatus 5.

The parameters used in the Table 4 are as follows:

| | |
| --- | --- |
| Message Type | 8 bit field indicating the type of message being sent |
| Message Reference | 8 bit field used to link a series of message exchanges in to a session |
| Equipment Type | 64 bit field characterising the manufacturer and products used uniquely |
| Electronic Serial Number | 64 bit field uniquely identifying this product from other equipment of the same type |
| Appliance location code | 64 bit field uniquely identifying the security provider and the property |
| Owners name | 20 ASCII 2 characters |
| Address Line | 20 ASCII 2 characters |
| Checksum | 16 bit checksum indicating potential message corruption |

Figure 16A:
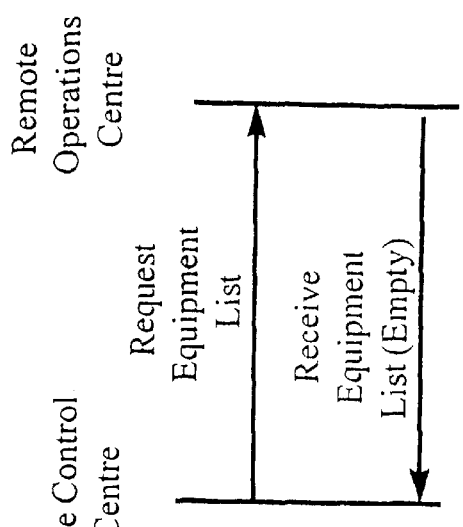
Figure 16B:
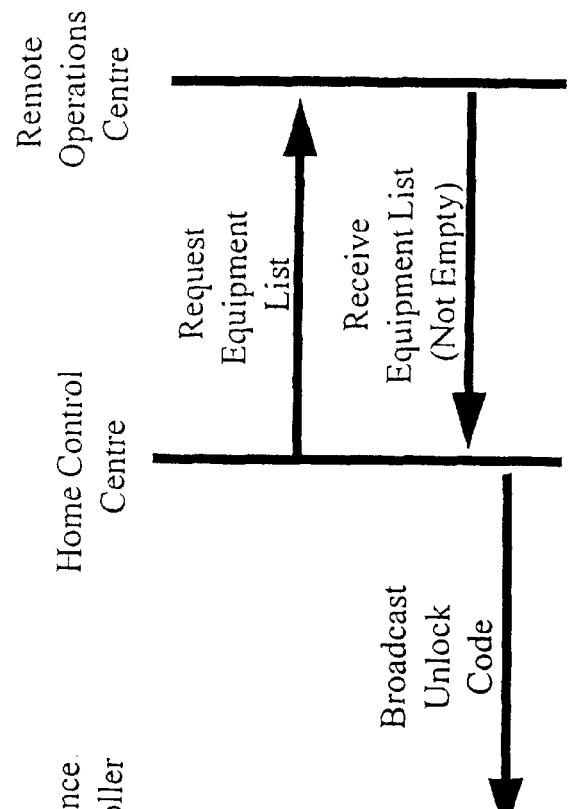

To summarise the interaction of appliances 5, the home control centre 2 and the remote operations centre 4 reference is now made to FIG. 16 and firstly to FIG. 16A. When a home control centre 2 is first connected to the mains electricity supply 6, that is to say when the system is first supplied and prior to any security aware apparatus being connected, a request equipment list message is sent from the home control centre to the remote operations centre by way of the telecommunications network 7. The remote operations centre 4 responds with an equipment list which is empty and no further interchange occurs. In FIG. 16B a subsequent powering up of the home control centre 2 after one or more pieces of security aware apparatus have been coded up result in the home control centre 2 forwarding a request equipment list as previously in 16A and receiving an equipment list containing one or more entries. As a result of receiving an equipment list having an entry the home control centre forwards the house broadcast unlock code which will be received by all appliance controllers in security aware apparatus 5 connected to the system. FIG. 16C shows message flows when security aware apparatus 5 is first connected in to mains power or is connected in to mains power for the first time after a home control centre 2 becomes available. As previously noted when the apparatus 5 is first connected an unlock request is sent using FSK on the mains electricity supply 6 to the home control centre 2. Having determined that the home control centre does not have the identified piece of apparatus in its own list the home control centre forwards via the telephone communications network 7 to the remote operations an equipment code required request and will receive the equipment code response from the remote operations centre. Subsequently the home control centre sends a system lock enable to the appliance controller and assuming that the message is satisfactorily received by way of the mains electricity supply 6 the security aware appliance having been coded returns the system lock enabled to the home control centre which in turn forwards an equipment store confirm to the remote operations centre so that the remote operators centre will effect updating of the equipment list.

FIG. 16D shows the simple message flows when a security aware appliance 5 which has been previously coded and which is included in the listing of the home control centre 2 is reconnected to the mains power supply 6. The appliance controller in the security aware appliance 5 forwards an unlock request to the home control centre which responds with an unlock response containing the equipment unlocking code or, if individual locking codes for equipment is not in use responds with the house code. The remote operations centre 4 is not involved in this transaction and no network access is required.

Figure 16E:
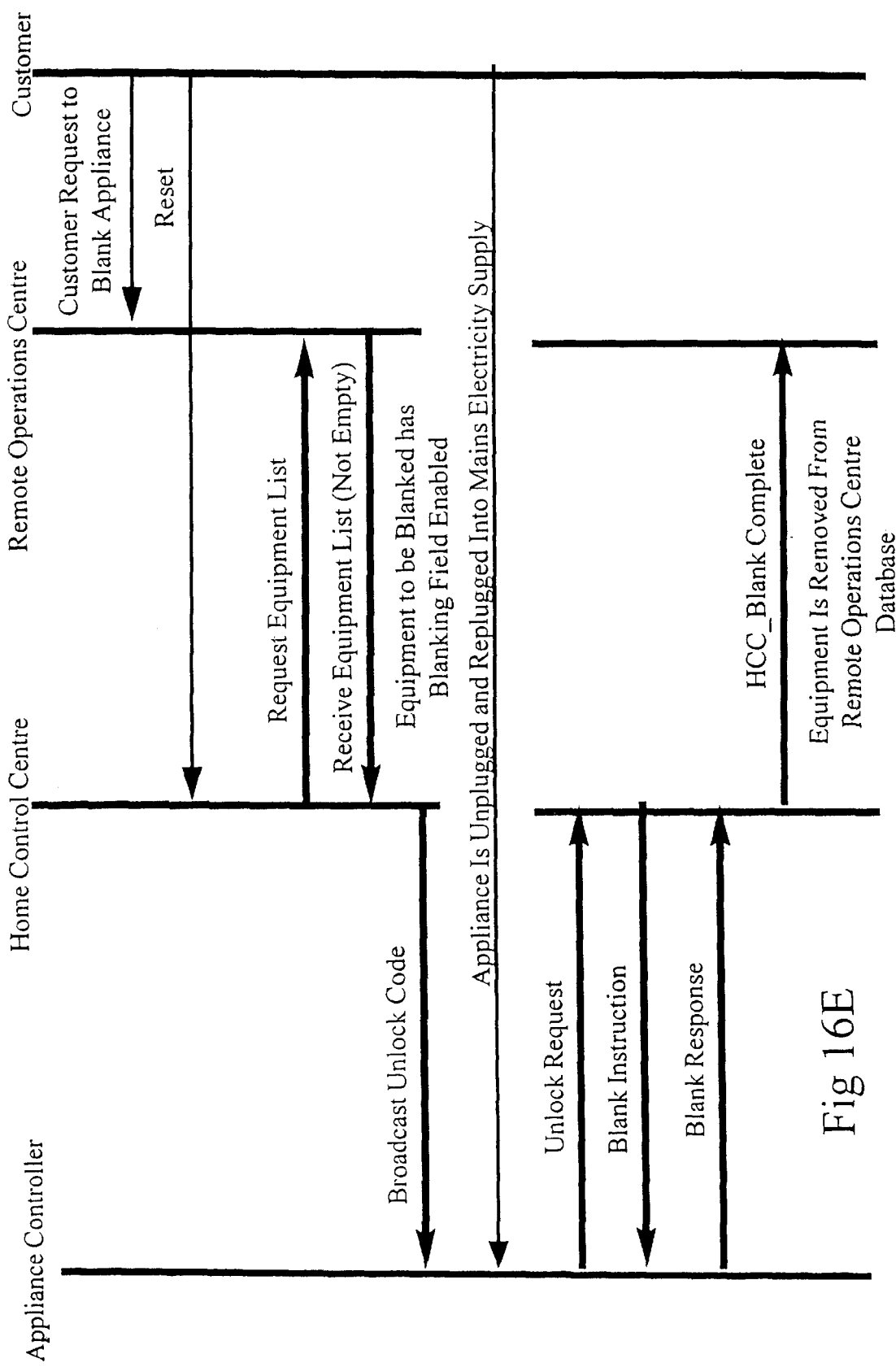

FIG. 16E shows the procedure for an appliance blanking sequence. The blanking sequence is the most complex resulting in a number of interchanges between the customer, the remote operations centre and the home control centre.

In the first instance the customer initiates a verbal request to the remote operations centre to reflect blanking of appliance. As previously noted this procedure could be automated with the use of personal identification numbers and other security codes.

As a result of the customer request, the remote operations centre marks the appropriate appliance in the list has to be blanked or marked in the appliances in the list are as to be blanked in due course.

The customer now resets the home control centre 2 either via unplugging or replugging the home control centre to the mains electricity supply or by means of a reset switch on the unit. As soon as the mains power supply is reconnected to the home control centre 2 it will request an equipment list from the remote operations centre and will receive an equipment list in which the equipment to be blanked has its blanking field enabled and its blanking code. Because the home control centre 2 has been disconnected from main power it will broadcast an unlock code to all appliances in the premises that is to say the house unlock code will be broadcast. The customer now causes disconnection of the mains electricity supply to the security aware apparatus 5 which is to be blanked.

This results in an unlock request being sent to the home control centre which proceeds to forward a blank instruction to the apparatus 5 and receives a blank response. Once the blanked response is received from the apparatus 5 then the home control centre causes a blank complete message to be forwarded to the remote operations centre 4 which then removes the equipment from the list at the remote operations centre and may respond with a new equipment list to the home control centre to be stored at the home control centre 2. Alternatively the home control centre will delete the apparatus from the list.

FIG. 17 shows the data storage requirement of each of the security aware apparatus 5 for installation. A manufacturer reference of 16 bits which will be allocated under central control to identify specific manufacturers and a manufacturers equipment reference of 48 bits used by the identified manufacturer to identify his particular equipment type for example a split between the type of equipment (e.g. television set and model number) as required. An electronic serial number of 64 bits allocated by the manufacturer to identify specifically the piece of equipment is also held in permanent memory in the associated data store. The remaining data coding is in read/write memory including an appliance location code downloaded from the remote operations centre 4, the first 24 bits identifying the remote operations centre and allocated on a central basis and the house identity of 48 bits being allocated by the ROC on the first application by a home control centre from a particular authorised CLI.

The house unlock code of 24 bits which may be the only required code to unlock a piece of secure apparatus may be present this having been downloaded from the remote operations centre to the home control centre. Additionally an optional appliance unlock field may be provided so that specific unlocking of individual appliances when power failure does not occur can be controlled. A blanking code of 24 bits also allocated on the first application to the ROC is provided and will be non-zero once the appliance has been activated through a home control centre 2. If the blanking code is zero then this would indicate that the equipment has been successfully cleared or has not been previously allocated to a secure environment. FIG. 18 shows schematically the data storage requirement of the remote operations centre. On a per customer location basis there will be a requirement for the location code of 40 bits, the house unlock code for that customer location and the calling line identity (customer telephone number) which is authorised to access this particular data. A customer blanking personal identification number may also be stored so that automatic equipment blanking can be carried out or a check can be carried out to identify that the correct customer is making a call requesting a blanking of apparatus at the customer location. The customer's name and address in ASCII characters are stored together with an indication of the number of appliances currently protected at the identified location. For each appliance at the location there will be a requirement to identify the particular appliance number in the list in 16 bit form, the equipment type and electronic serial number as previously referenced in FIG. 17. A 24 bit appliance unlock code if individual unlocking per appliance is being used rather than using purely the house unlock code to unlock all apparatus and the blanking code on a per appliance basis as generated on first application of the equipment to the home control centre 2. Various flags such as the requirement for providing blanking to the particular appliance will also be present.

Finally FIG. 19 shows schematically the data storage requirement in the volatile memory of the home control centre. This essentially comprises the number of appliances in the list, a house unlock code of 24 bits as generated by the remote operations centre and the list number appliance identity and appliance unlock code for each appliance. If a particular appliance is to be blanked then the blanking flag will be set and a blanking code of 24 bits will also be present for the particular appliance to be blanked.

What is claimed is:

1. A security system comprising:

access means to cause seizure of a connection to a telephone exchange, means in the exchange to generate coded signals which identify the source of the seizure and service means responsive to the coded signals to transmit to the access means security signals which identify at least one protected apparatus and a release code for each such protected apparatus, the access means including storage means for simultaneously storing a plurality of respective identity and release codes, means to monitor a mains electrical connection for signals from protected apparatus requesting a release code and means to transmit the respective release code to the mains electrical connection.

2. A security system comprising:

access means to cause seizure of a connection to a telephone exchange, means in the exchange to generate coded signals which identify the source of the seizure and service means responsive to the coded signals to transmit to the access means security signals which identify at least one protected apparatus and a release code for each such protected apparatus, the access means including storage means for storing the identity and the release code, means to monitor a mains electrical connection for signals from protected apparatus requesting a release code and means to transmit the respective release code to the mains electrical connection; and wherein the service means transmits a data table identifying each protected apparatus with a corresponding release code and house code for all protected apparatuses at a specified location, said house code being used to release all said protected apparatuses simultaneously.

3. A security system comprising:

access means to cause seizure of a connection to a telephone exchange, means in the exchange to generate coded signals which identify the source of the seizure and service means responsive to the coded signals to transmit to the access means security signals which identify at least one protected apparatus and a release code for each such protected apparatus, the access means including storage means for storing the identity and the release code, means to monitor a mains electrical connection for signals from protected apparatus requesting a release code and means to transmit the respective release code to the mains electrical connection; and wherein the access means includes a data store which is cleared of all data if either the mains electrical power or the telephone line is disconnected from the access means, and the data store holds a list of identities for each protected apparatus at the location and a release code for each such protected apparatus.

4. A security system as in claim 3 in which:

after disconnection of electrical power to the access means, and on subsequent reconnection thereof, the access means causes seizure of a connection to service means responsive to signals which identify the location of the access means to transmit thereto the list of apparatuses and release codes therefor.

5. A security system as in claim 4 in which:

the access means on receiving a house code from the service means immediately transmits the house code to the mains power circuit.

6. A security module for inclusion in electrically powered apparatus and having:

means responsive to signals received from a power line to permit or deny connection of electrical power to operational circuits of the apparatus, the module being responsive to connection of mains power to monitor the electrical power line for signals identifying a house code valid for the protected apparatus to permit connection of power to operational circuits and if such signals are not received within a predetermined period to transmit to the power line signals requesting a release code for the apparatus.

7. A security module as in claim 6 in which the house code and release code for a protected apparatus are the same.

8. A security module as in claim 6 in which the house code and the release code for a protected apparatus are different and the release code is specific to the protected apparatus.

9. A security module as in claim 6 in which the module transmits signals to the electrical power line identifying its type, origin and serial number.

10. A security module as in claim 6 in which the module is responsive to a further code specific to the protected apparatus to effect disconnection of the protection system whereby power is permitted to be connected to the operational circuits without receipt of a valid release code.

11. A security module as in claim 6 wherein:

the security module is responsive to connection of mains electrical power to transmit a request to the electrical power line for a release code and, on receipt from the electrical power line of signals identifying at least one release code, to activate a protection system which prevents power being supplied to operational circuits thereafter unless following disconnection and reconnection of the mains electrical power an appropriate release code is received.

12. A service platform for connection to a telecommunications network, the platform including:

storage means for storing data identifying a multiplicity of customer premises and for storing respective house data for each of said customer premises, said house data including house code data identifying at least one respective house code specific to said premises and including contents data identifying one or more protected apparatuses and at least one apparatus release code specific to each such protected apparatus, the platform further including means responsive to signals identifying origin of calls thereto to transmit to the origin signals identifying the house code and the at least one protected apparatuses at the customer premises.

13. A service platform as in claim 12 in which the at least one apparatus release code is transmitted to the origin only after a previous request from the customer.

14. A service platform as in claim 12 in which a second apparatus release code is associated with each protected apparatus, said second apparatus release code being transmitted to the origin in association with the data identifying the protected apparatus.

15. A method for providing a security system for protected apparatuses physically located at various sites distributed throughout a geographical area, said method comprising:

causing seizure of a connection from one of said sites to a telephone exchange;

generating coded signals which identify the source site of the seizure and responsively transmitting the coded signals back to the source site which identify at least one protected apparatus and a release code for each such protected apparatus located thereat;

locally storing the identity and the release code together with at least one other respective identity and release code relating to a respective protected apparatus at said source site;

monitoring a mains electrical connection at the source site for signals from protected apparatus threat requesting a release code; and transmitting the respective release code from the stored signals to the mains electrical connection.

16. A method for providing a security system for protected apparatuses physically located at various sites distributed throughout a geographical area, said method comprising:

causing seizure of a connection from one of said sites to a telephone exchange;

generating coded signals which identify the source site of the seizure and responsively transmitting the coded signals back to the source site which identify at least one protected apparatus and a release code for each such protected apparatus located thereat;

locally storing the identity and the release code at said source site;

monitoring a mains electrical connection at the source site for signals from protected apparatus threat requesting a release code; and transmitting the respective release code from the stored signals to the mains electrical connection;

wherein the responsively transmitted coded signals include a data table identifying each protected apparatus at the respective site with a corresponding release code and a house code for all protected apparatuses at that specified site, said house code being used to release all said protected apparatuses simultaneously.

17. A method for providing a security system for protected apparatuses physically located at various sites distributed throughout a geographical area, said method comprising:

causing seizure of a connection from one of said sites to a telephone exchange;

generating coded signals which identify the source site of the seizure and responsively transmitting the coded signals back to the source site which identify at least one protected apparatus and a release code for each such protected apparatus located thereat;

locally storing the identity and the release code at said source site;

monitoring a mains electrical connection at the source site for signals from protected apparatus threat requesting a release code; and transmitting the respective release code from the stored signals to the mains electrical connection;

wherein a data store at a site is cleared of all data if either the mains electrical power or the telephone line is disconnected from associated security apparatus at the site, the data store holding a list of identities for each protected apparatus at that site location and a release code for each such protected apparatus threat.

18. A method as in claim 17 in which:

after disconnection of electrical power and on subsequent reconnection thereof, seizure of a connection to the telephone exchange is made responsive to signals which identify the source location site to transmit thereto the list of apparatuses and release codes therefor.

19. A method as in claim 18 in which:

upon receiving a house code from the telephone exchange, it is immediately transmitted locally at the source site to the mains power circuit at that site.

20. A method for establishing security within electrically powered apparatuses located at corresponding physical sites, said method comprising:

responsive to signals received from a power line, permitting or denying connection of electrical power to operational circuits of the apparatus, responsive to connection of mains power to the apparatus, monitoring the electrical power line for signals identifying a house code valid for the protected apparatus to permit connection of power to operational circuits and if such signals are not received within a predetermined period to transmit to the power line signals requesting a release code for the apparatus.

21. A method as in claim 20 in which the house code and release code for a protected apparatus are the same.

22. A method as in claim 20 in which the house code and the release code for a protected apparatus are different and the release code is specific to the protected apparatus.

23. A method as in claim 20 in which the protected apparatus transmits signals to the electrical power line identifying its type, origin and serial number.

24. A method as in claim 20 in which the protected apparatus is responsive to a further code specific to the protected apparatus to effect disconnection of the protection system whereby power is permitted to be connected to the operational circuits without receipt of a valid release code.

25. A method as in claim 20 wherein:

responsive to connection of mains electrical power to the protected apparatus, transmitting a request to the electrical power line for a release code and, on receipt from the electrical power line of signals identifying at least one release code, to activate a protection system which prevents power being supplied to operational circuits thereafter unless following disconnection and reconnection of the mains electrical power an appropriate release code is received.

26. A method of providing security services for connection to a telecommunications network, the method including:

storing data identifying a multiplicity of customer premises and storing respective house data for each of said customer premises, said house data including house code data identifying at least one respective house code specific to said premises and including contents data identifying one or more protected apparatuses and at least one apparatus release code specific to each such protected apparatus, and responsive to signals identifying origin of calls thereto, transmitting to the origin site signals identifying the house code and the at least one protected apparatuses at the customer premises.

27. A method as in claim 26 in which the at least one apparatus release code is transmitted to the origin only after a previous request from the customer.

28. A method as in claim 26 in which a second apparatus release code is associated with each protected apparatus, said second apparatus release code being transmitted to the origin site in association with the data identifying the protected apparatus.

* * * * *